US012272061B2

(12) United States Patent
Ohsaka et al.

(10) Patent No.: US 12,272,061 B2
(45) Date of Patent: Apr. 8, 2025

(54) IMAGE ANALYSIS METHOD, APPARATUS, NON-TRANSITORY COMPUTER READABLE MEDIUM, AND DEEP LEARNING ALGORITHM GENERATION METHOD

(71) Applicants: JUNTENDO EDUCATIONAL FOUNDATION, Tokyo (JP); SYSMEX CORPORATION, Kobe (JP)

(72) Inventors: Akimichi Ohsaka, Tokyo (JP); Yoko Tabe, Tokyo (JP); Konobu Kimura, Kobe (JP)

(73) Assignees: JUNTENDO EDUCATIONAL FOUNDATION, Tokyo (JP); SYSMEX CORPORATION, Kobe (JP)

( * ) Notice: Subject to any disclaimer, the term of this patent is extended or adjusted under 35 U.S.C. 154(b) by 0 days.

(21) Appl. No.: 18/489,475

(22) Filed: Oct. 18, 2023

(65) Prior Publication Data
US 2024/0062377 A1    Feb. 22, 2024

Related U.S. Application Data

(63) Continuation of application No. 17/398,850, filed on Aug. 10, 2021, now Pat. No. 11,830,188, which is a
(Continued)

(30) Foreign Application Priority Data

May 10, 2018   (JP) ................. 2018-091776

(51) Int. Cl.
G06T 7/12 (2017.01)
G06F 18/214 (2023.01)
(Continued)

(52) U.S. Cl.
CPC ........ G06T 7/0012 (2013.01); G06F 18/2148 (2023.01); G06F 18/2431 (2023.01);
(Continued)

(58) Field of Classification Search
CPC ........ G06T 7/0012; G06T 2207/20076; G06T 2207/20081; G06T 2207/20084;
(Continued)

(56) References Cited

U.S. PATENT DOCUMENTS 5,830,141 A   11/1998   Makram-Ebeid et al.
6,463,438 B1   10/2002   Veltri et al.
(Continued)

FOREIGN PATENT DOCUMENTS

CN    103745210 A    4/2014
CN    104732524 A    6/2015
(Continued)

OTHER PUBLICATIONS

Abbas et al., "Microscopic RGB Color Images Enhancement for Blood Cells Segmentation in YCbCr Color Space for K-Means Clustering", Journal of Theoretical and Applied Information Technology, 2013, vol. 55, No. 1, pp. 117-125, dated Sep. 10, 2013, 9 pages.
(Continued)

*Primary Examiner* — Michael R Neff
(74) *Attorney, Agent, or Firm* — Crowell & Moring LLP

(57) ABSTRACT

Disclosed is an image analysis method including inputting analysis data, including information regarding an analysis target cell to a deep learning algorithm having a neural network structure, and analyzing an image by calculating, by use of the deep learning algorithm, a probability that the analysis target cell belongs to each of morphology classifications of a plurality of cells belonging to a predetermined cell group.

20 Claims, 18 Drawing Sheets

Related U.S. Application Data continuation of application No. 16/406,523, filed on May 8, 2019, now Pat. No. 11,093,729.

(51) Int. Cl.
| | |
|---|---|
| *G06F 18/2431* | (2023.01) |
| *G06N 3/08* | (2023.01) |
| *G06T 7/00* | (2017.01) |
| *G06V 10/44* | (2022.01) |
| *G06V 10/764* | (2022.01) |
| *G06V 10/82* | (2022.01) |
| *G06V 20/69* | (2022.01) |

(52) U.S. Cl.
CPC ............. *G06N 3/08* (2013.01); *G06V 10/449* (2022.01); *G06V 10/764* (2022.01); *G06V 10/82* (2022.01); *G06V 20/698* (2022.01); *G06T 2207/20076* (2013.01); *G06T 2207/20081* (2013.01); *G06T 2207/20084* (2013.01)

(58) Field of Classification Search
CPC .... G06V 20/698; G06V 10/449; G06V 10/82; G06V 10/764; G06F 18/2148; G06F 18/2431; G06N 3/08
USPC .......................................................... 382/134
See application file for complete search history.

(56) References Cited

U.S. PATENT DOCUMENTS

| | | | |
|---|---|---|---|
| 9,934,364 | B1 | 4/2018 | Kumar et al. |
| 10,106,153 | B1 | 10/2018 | Xiao et al. |
| 10,134,131 | B1 | 11/2018 | Ando et al. |
| 10,254,286 | B2 | 4/2019 | Pirie-Shepherd et al. |
| 10,650,929 | B1 | 5/2020 | Beck et al. |
| 10,977,788 | B2 | 4/2021 | Sasagawa et al. |
| 11,093,729 | B2 | 8/2021 | Ohsaka et al. |
| 11,276,500 | B2 | 3/2022 | Styner et al. |
| 2002/0177574 | A1 | 11/2002 | Taylor |
| 2003/0087248 | A1 | 5/2003 | Morrison et al. |
| 2005/0260580 | A1 | 11/2005 | Verma |
| 2008/0015448 | A1 | 1/2008 | Keely et al. |
| 2008/0033253 | A1 | 2/2008 | Neville et al. |
| 2009/0075903 | A1 | 3/2009 | Siegel |
| 2011/0176710 | A1 | 7/2011 | Mattiuzzi et al. |
| 2011/0182490 | A1 | 7/2011 | Hoyt et al. |
| 2012/0190060 | A1 | 7/2012 | Tang |
| 2013/0190194 | A1 | 7/2013 | Tang |
| 2013/0337487 | A1 | 12/2013 | Loewke |
| 2014/0154703 | A1* | 6/2014 | Skelley ............. B01L 3/502761 435/7.23 |
| 2014/0185906 | A1 | 7/2014 | Ding et al. |
| 2014/0206006 | A1 | 7/2014 | Xu et al. |
| 2015/0003701 | A1 | 1/2015 | Klauschen et al. |
| 2015/0204771 | A1 | 7/2015 | Sun et al. |
| 2016/0022238 | A1 | 1/2016 | Park |
| 2016/0350914 | A1 | 12/2016 | Champlin et al. |
| 2017/0132450 | A1 | 5/2017 | El-Zehiry et al. |
| 2017/0212028 | A1 | 7/2017 | Correia De Matos Nolasco Lamas et al. |
| 2017/0285035 | A1 | 10/2017 | Dittamore |
| 2018/0156700 | A1 | 6/2018 | Natarajan et al. |
| 2018/0157916 | A1 | 6/2018 | Doumbouya et al. |
| 2018/0157972 | A1 | 6/2018 | Hu et al. |
| 2018/0182099 | A1 | 6/2018 | Lesniak |
| 2018/0211380 | A1 | 7/2018 | Tandon et al. |
| 2018/0247195 | A1 | 8/2018 | Kumar et al. |
| 2018/0315190 | A1 | 11/2018 | Sasagawa et al. |
| 2018/0322327 | A1 | 11/2018 | Smith et al. |
| 2019/0034762 | A1 | 1/2019 | Hashimoto |
| 2019/0050534 | A1 | 2/2019 | Apte et al. |
| 2019/0080467 | A1 | 3/2019 | Hirzer et al. |
| 2019/0094115 | A1 | 3/2019 | Bhakdi |
| 2019/0147337 | A1 | 5/2019 | Yang |
| 2019/0256885 | A1 | 8/2019 | Nanjo et al. |
| 2019/0302000 | A1 | 10/2019 | Lo et al. |
| 2019/0384047 | A1 | 12/2019 | Johnson et al. |
| 2020/0026962 | A1 | 1/2020 | Sha et al. |
| 2020/0126234 | A1 | 4/2020 | Yokota |
| 2020/0151877 | A1 | 5/2020 | Hattori et al. |
| 2020/0152326 | A1 | 5/2020 | Sanchez-Martin et al. |
| 2020/0202514 | A1 | 6/2020 | Yang et al. |
| 2020/0340909 | A1 | 10/2020 | Ohsaka |
| 2020/0370130 | A1 | 11/2020 | Sussman et al. |
| 2020/0372235 | A1 | 11/2020 | Peng et al. |
| 2020/0380672 | A1 | 12/2020 | Clark et al. |
| 2021/0004650 | A1 | 1/2021 | Frank |
| 2021/0020314 | A1 | 1/2021 | Ehrich et al. |
| 2021/0033599 | A1 | 2/2021 | Kiyuna et al. |

FOREIGN PATENT DOCUMENTS

| | | |
|---|---|---|
| CN | 106127255 A | 11/2016 |
| JP | H10-197522 A | 7/1998 |
| JP | H 11-511854 A | 10/1999 |
| JP | 2008-533440 A | 8/2008 |
| JP | 2009-044974 A | 3/2009 |
| JP | 2011-229413 A | 11/2011 |
| JP | 2016-534709 A | 11/2016 |
| JP | 2017516992 A | 6/2017 |
| JP | 2018-185759 A | 11/2018 |
| WO | WO 97/16718 | 5/1997 |
| WO | WO 2006/083969 A2 | 8/2006 |
| WO | WO 2015/177268 A1 | 11/2015 |
| WO | WO 2017/155869 A1 | 9/2017 |
| WO | WO 2018/156133 A1 | 8/2018 |
| WO | WO 2019/039595 A1 | 2/2019 |
| WO | WO 2019/100032 A2 | 5/2019 |

OTHER PUBLICATIONS

Blood Disease Commentary, obtained from the Internet on Mar. 30, 2020, from URL Address: <http://www.med.osaka-cu.ac.jp/labmed/page074.html>, including English translation, 4 pages.

Decision of Refusal with English Translation, dated Oct. 25, 2022, pp. 1-7, for the corresponding Japanese Patent Application No. 2018-091776, Japanese Patent Office, Tokyo, Japan.

Diaz et al., "Infected Cell Identification in Thin Blood Images Based on Color Pixel Classification: Comparison and Analysis", CIARP 2007: Progress in Pattern Recognition, Image Analysis and Applications, 2007, pp. 812-821, 10 pages.

Extended European Search Report dated Mar. 27, 2020, for the corresponding European patent application No. 19172959.9, 13 pages.

Extended European Search Report dated Sep. 22, 2020 for the related European patent application No. 20171050.6, 10 pages.

Handfield et al. "Unsupervised Clustering of Subcellular Protein Expression Patterns in High-Throughput Microscopy Images Reveals Protein Complexes and Functional Relationships between Proteins," PLOS Computational Biology | www.ploscompbiol.org | Jun. 2013 | vol. 9 | Issue 6 | e1003085 (Year: 2013).

Human Cell, 2018, vol. 31, Hirohiko Niioka et al., "Classification of C2C12 cells at differentiation by convolutional neural network of deep learning using phase contrast images", pp. 87-93 (Year: 2017).

ICIIS, 2017, 1570376781, Arna Ghosh et al., "Simultaneous Localization and Classification of Acute Lymphoblastic Leukemic Cells in Peripheral Blood Smears Using a Deep Convolutional Network with Average Pooling Layer," pp. 1-6, (Year: 2017).

Japanese Office Action with English Translation, dated Feb. 7, 2023, pp. 1-3, issued in Japanese patent application No. 2019-086363, Japan Patent Office, Chiyoda Tokyo, Japan.

Jones et al. "Scoring diverse cellular morphologies in image-based screens with iterative feedback and machine learning" PNAS Feb. 10, 2009, vol. 106, No. 6, pp. 1826-1831. (Year: 2009).

Kim et al., "Analyzing Blood Cell Image to Distinguish Its Abnormalities", Proceedings ACM Multimedia, 2000, pp. 395-397.

(56) References Cited

OTHER PUBLICATIONS

Madabhushi et al., "Image analysis and machine learning in digital pathology: Challenges and opportunities," Medical Image Analysis 33 (2016) 170-175 (Year: 2016).
Office Action dated Jan. 5, 2022 for the corresponding European patent application No. 19172959.9, 6 pages.
Office Action dated Jun. 2, 2022 for European patent application No. 20171050.6.
Office Action dated Mar. 15, 2022 for JP patent application No. 2018-091776, including English translation, 10 pages.
Partial European Search Report for Europe Application No. 19172959.9, dated Nov. 19, 2019, 14 pages.
Tomita et al., "Differential Diagnosis of Various Thrombocytopenias in Childhood by Analysis of Platelet Volume," Pediat. Res. 14: 133-137 (1980) (Year: 1980).
US Office Action, dated Dec. 27, 2022, pp. 1-26, Issued in U.S. Appl. No. 16/857,495, United States Department of Commerce, United States Patent and Trademark Office, Alexandria, Virginia.
US Office Action, dated Jul. 8, 2022, pp. 1-31, Issued in U.S. Appl. No. 16/857,495, United States Patent and Trademark Office, Alexandria, Virginia.
US Office Action, dated Jun. 15, 2023, pp. 1-35, issued in U.S. Appl. No. 16/857,495, United States Patent and Trademark Office, Alexandria, Virginia.
Zheng et al., "Direct Neural Network Application for Automated Cell Recognition", Cytometry Part A, 2004, vol. 57A, No. 1, pp. 1-9.
Brieu et al., "Context-based Interpolation of Coarse Deep Learning Prediction Maps for the Segmentation of Fine Structures in Immunofluorescence Images" Progress in Biomedical Optics and Imaging, SPIE, 2018, vol. 10581, pp. 105810P_1-105810P_6, 6 pages.
Office Action dated Dec. 19, 2023 for the corresponding European patent application No. 191729599, 6 pages.
Summons dated Nov. 30, 2023 for the corresponding European patent application No. 201710506, 10 pages.
Office Action dated Dec. 5, 2023 for the corresponding Japanese patent application No. 2023-008570, including English translation, 10 pages.
Office Action in Related Japanese Patent Application No. 2023-008570 dated Jul. 30, 2024 (10 pages).
Abbas, N., et al., "Microscopic RGB Color Images Enhancement for Blood Cells Segmentation in YCbCr Color Space for K-Means Clustering", *Journal of Theoretical and Applied Information Technology*, Sep. 2013, vol. 55, No. 1, pp. 117-125 (9 pages).
CIARP 2007, LNCS, 2007, vol. 4756, Diaz, G., et al. "Infected Cell Identification in Thin Blood Images Based on Color Pixel Classification: Comparison and Analysis", pp. 812-821 (10 pages).
Office Action in Related Japanese Patent Application No. 2023-183746 dated Jul. 9, 2024 (5 pages).
Office action in Chinese application no. 2019103870080, dated May 23, 2024, 15 pages (with English translation).

\* cited by examiner

FIG. 3

| CELL TYPE | LABEL VALUE | CELL TYPE | FEATURE | | LABEL VALUE |
|---|---|---|---|---|---|
| NOT APPLICABLE | 0 | BLAST | MORPHOLOGICAL NUCLEUS ABNORMALITY | PRESENT | 21 |
| SEGMENTED NEUTROPHIL | 1 | | | ABSENT | 22 |
| BAND NEUTROPHIL | 2 | | VACUOLATION | PRESENT | 23 |
| METAMYELOCYTE | 3 | | | ABSENT | 24 |
| BONE MARROW CELL | 4 | | GRANULE | PRESENT | 25 |
| PROMYELOCYTE | 5 | | | ABSENT | 26 |
| BLAST | 6 | BAND NEUTROPHIL | GIANT | PRESENT | 27 |
| LYMPHOCYTE | 7 | | | ABSENT | 28 |
| PLASMA CELL | 8 | | NUCLEUS MORPHOLOGY ABNORMALITY (INCLUDING SPHERICAL/ELLIPTIC NUCLEUS) | PRESENT | 29 |
| ATYPICAL LYMPHOCYTE | 9 | | | ABSENT | 30 |
| MONOCYTE | 10 | | GRANULE DISTRIBUTION ABNORMALITY (INCLUDING AGRANULAR ONES) | PRESENT | 31 |
| EOSINOPHIL | 11 | | | ABSENT | 32 |
| BASOPHIL | 12 | SEGMENTED NEUTROPHIL | GIANT | PRESENT | 33 |
| ERYTHROBLAST | 13 | | | ABSENT | 34 |
| GIANT PLATELET | 14 | | NUCLEUS MORPHOLOGY ABNORMALITY (INCLUDING CIRCULAR NUCLEUS) | PRESENT | 35 |
| PLATELET AGGREGATE | 15 | | | ABSENT | 36 |
| MEGAKARYOCYTE | 16 | | PSEUDO PELGER (HYPOSEGMENTED NUCLEUS) | PRESENT | 37 |
| SMUDGE | 17 | | | ABSENT | 38 |
| ARTIFACT | 18 | | HYPERSEGMENTED | PRESENT | 39 |
| | | | | ABSENT | 40 |
| | | | GRANULE DISTRIBUTION ABNORMALITY (INCLUDING AGRANULAR ONES) | PRESENT | 41 |
| | | | | ABSENT | 42 |
| | | ERYTHROBLAST | GIANT | PRESENT | 43 |
| | | | | ABSENT | 44 |
| | | MEGAKARYOCYTE | BARE NUCLEUS | PRESENT | 45 |
| | | | | ABSENT | 46 |

FIG. 17

| | MACHINE LEARNING METHOD (D1-60) | DEEP LEARNING METHOD | | VALIDATION | NUMBER OF TRAINING IMAGES |
|---|---|---|---|---|---|
| SEGMENTED NEUTROPHIL | 93.9% | 97.6% | SEGMENTED NEUTROPHIL | 705 | 280956 |
| BAND NEUTROPHIL | 19.8% | 56.3% | BAND NEUTROPHIL | 414 | 18687 |
| METAMYELOCYTE | 15.2% | 60.8% | METAMYELOCYTE | 217 | 2328 |
| BONE MARROW CELL | 63.4% | 94.0% | BONE MARROW CELL | 333 | 4946 |
| BLAST | 85.5% | 92.9% | BLAST | 325 | 2697 |
| LYMPHOCYTE | 97.9% | 98.3% | LYMPHOCYTE | 520 | 83866 |
| ATYPICAL LYMPHOCYTE | 0.0% | 50.0% | ATYPICAL LYMPHOCYTE | 12 | 3622 |
| MONOCYTE | 79.9% | 88.3% | MONOCYTE | 547 | 33421 |
| EOSINOPHIL | 77.7% | 96.8% | EOSINOPHIL | 555 | 12325 |
| BASOPHIL | 86.9% | 80.4% | BASOPHIL | 434 | 2697 |
| ERYTHROBLAST | 89.2% | 90.1% | ERYTHROBLAST | 111 | 5171 |
| GIANT PLATELET | 94.9% | 94.6% | GIANT PLATELET | 626 | 59959 |
| PLATELET AGGREGATION | 0.0% | 98.3% | PLATELET AGGREGATION | 471 | 2261 |
| MEGAKARYOCYTE | 0.0% | 72.7% | MEGAKARYOCYTE | 11 | 358 |
| SMUDGE | 73.4% | 94.9% | SMUDGE | 533 | 66023 |
| ARTIFACT | 54.2% | 85.6% | ARTIFACT | 522 | 7418 |

FIG. 18

| cell | ABNORMALITY | test | SENSITIVITY | SPECIFICITY | AUC | NUMBER OF LEARNING CELLS |
|---|---|---|---|---|---|---|
| blast | B1 MORPHOLOGICAL NUCLEUS ABNORMALITY | 41 | 97.6% | 95.7% | 0.98 | 641 |
| blast | B2 VACUOLATION | 41 | 91.7% | 93.0% | 0.97 | 597 |
| blast | B3 GRANULE | 21 | 95.2% | 93.7% | 0.98 | 306 |
| band | BN2 GIANT | 62 | 89.3% | 90.7% | 0.96 | 1177 |
| band | BN3 NUCLEUS MORPHOLOGY ABNORMALITY | 23 | 72.7% | 80.9% | 0.84 | 259 |
| band | BN4 GRANULE DISTRIBUTION ABNORMALITY | 30 | 83.3% | 88.5% | 0.93 | 554 |
| seg | SN2 GIANT | 100 | 77.4% | 90.4% | 0.92 | 4651 |
| seg | SN3 NUCLEUS MORPHOLOGY ABNORMALITY | 40 | 60.0% | 73.2% | 0.72 | 711 |
| seg | SN4 PSEUDO PELGER | 91 | 84.9% | 91.3% | 0.96 | 1695 |
| seg | SN5 HYPERSEGMENTED | 13 | 53.8% | 51.5% | 0.56 | 191 |
| seg | SN7 GRANULE DISTRIBUTION ABNORMALITY | 121 | 84.4% | 90.2% | 0.94 | 7908 |
| platelet | GIANT | 50 | 89.8% | 91.8% | 0.97 | 882 |

IMAGE ANALYSIS METHOD, APPARATUS, NON-TRANSITORY COMPUTER READABLE MEDIUM, AND DEEP LEARNING ALGORITHM GENERATION METHOD

RELATED APPLICATIONS

This application is a continuation of U.S. application Ser. No. 17/398,850, filed on Aug. 10, 2021, titled "Image Analysis Method, Apparatus, Non-Transitory Computer Readable Medium, And Deep Learning Algorithm Generation Method," which is a continuation of U.S. application Ser. No. 16/406,523, filed on May 8, 2019, also titled "Image Analysis Method, Apparatus, Non-Transitory Computer Readable Medium, And Deep Learning Algorithm Generation Method," which issued as U.S. Pat. No. 11,093,729 on Aug. 17, 2021, and which claims priority to Japanese Patent Application No. 2018-091776, filed on May 10, 2018, the contents of each of which are incorporated herein by reference.

BACKGROUND OF THE INVENTION

1. Field of the Invention

The present disclosure relates to an image analysis method, apparatus, non-transitory computer readable medium, and deep learning algorithm generation method which analyze cell morphology.

2. Description of the Related Art

Japanese Translation of PCT International Application Publication No. 2016-534709 discloses a cell identification system for processing microscopic images. In the cell identification system, a model obtained through training using a machine training technique associates pixels in an obtained image with one or more of cell, cell edge, background, and equivalents. The machine training technique uses a Random Forest Decision Tree technique.

SUMMARY OF THE INVENTION

In cell examination, usually, an examiner observes cells through microscopic observation, and morphologically identifies the types or features of cells. However, cells of the same lineage have similar morphologies and thus, in order to become able to morphologically identify cells, it is necessary to improve the identification skill by observing a large number of cell preparations. In particular, identification of abnormal cells which emerge when a person has a disease requires experience. For example, when the emergence frequency of abnormal cells is low as in the case of myelodysplastic syndromes in an early stage, there is also a risk that an examiner having insufficient skills does not notice abnormal cells.

In addition, the number of preparations that an examiner can observe per day is limited, and observing 100 preparations or more per day is burdensome for the examiner.

Increasing the number of cell examination can be achieved by a flow-type automatic hemocyte classification apparatus or the like. However, information that can be obtained from such a flow-type automatic hemocyte classification apparatus is limited, and it has been difficult to identify hemocytes having low emergence frequencies, such as blast, promyelocyte, and giant platelet.

A method for identifying cells using a machine training technique (also referred to as machine learning) is also known, such as the method described in Japanese Translation of PCT International Application Publication No. 2016-534709. However, this method requires the user to create training data for training a machine learning model, and generation of the model requires tremendous labor. Since the user creates the training data, the number of pieces of training data that can be created is limited, and, at present, there are problems in the analysis accuracy by the machine learning model and the generalization capability.

The method described in Japanese Translation of PCT International Application Publication No. 2016-534709 is a method for identifying a cell portion and a non-cell portion in a microscopic image. Therefore, the method cannot identify what type each cell is, what abnormal finding the cell has, and the like.

The scope of the present invention is defined solely by the appended claims, and is not affected to any degree by the statements within this summary.

The present disclosure is to provide an image analysis method for more accurately identifying the morphology of each of a plurality of cells included in an analysis image.

An embodiment of the present disclosure relates to an image analysis method for analyzing a morphology of a cell by use of a deep learning algorithm (50, 51) having a neural network structure. In the image analysis method, analysis data (80) being generated from an image of an analysis target cell and including information regarding the analysis target cell is inputted to a deep learning algorithm (60, 61) having a neural network structure, and a probability that the analysis target cell belongs to each of morphology classifications of a plurality of cells belonging to a predetermined cell group is calculated by use of the deep learning algorithm. According to the present embodiment, without an examiner performing microscopic observation, it is possible to obtain the probability that the analysis target cell belongs to each of the morphology classifications of the plurality of cells belonging to the predetermined cell group.

Preferably, the image analysis method includes identifying, on the basis of the calculated probability, the morphology classification of the analysis target cell. According to the present embodiment, without the examiner performing microscopic observation, it is possible to identify which of the morphology classifications corresponds to the analysis target cell.

Preferably, the predetermined cell group is a group of blood cells. According to the present embodiment, without the examiner performing microscopic observation, it is possible to perform morphology classification of hemocytes.

Preferably, the predetermined cell group is a group of cells belonging to a predetermined cell lineage. More preferably, the predetermined cell lineage is hematopoietic system. According to the present embodiment, without the examiner performing microscopic observation, it is possible to perform morphology classification of cells belonging to the same cell lineage.

Preferably, each morphology classification indicates a type of cell. More preferably, the morphology classifications include: neutrophil, including segmented neutrophil and band neutrophil; metamyelocyte; bone marrow cell; promyelocyte; blast; lymphocyte; plasma cell; atypical lymphocyte; monocyte; eosinophil; basophil; erythroblast; giant platelet; platelet aggregate; and megakaryocyte. According to the present embodiment, even cells of the same lineage that have similar morphologies can be identified.

Preferably, each morphology classification indicates an abnormal finding of cell. More preferably, the morphology classifications include at least one selected from the group consisting of morphological nucleus abnormality, presence of vacuole, granule morphological abnormality, granule distribution abnormality, presence of abnormal granule, cell size abnormality, presence of inclusion body, and bare nucleus. According to the present embodiment, even a cell exhibiting an abnormal finding can be identified.

In the embodiment, data regarding the morphology of the cell is data regarding the type of the cell according to morphological classification, and data regarding a feature of the cell according to morphological classification. According to this embodiment, a morphological cell type and a morphological cell feature can be outputted.

In the embodiment, preferably, the deep learning algorithm includes a first algorithm configured to calculate a probability that the analysis target cell belongs to each of first morphology classifications of a plurality of cells belonging to a predetermined cell group, and a second algorithm configured to calculate a probability that the analysis target cell belongs to each of second morphology classifications of a plurality of cells belonging to a predetermined cell group. For example, each first morphology classification is a type of the analysis target cell, and each second morphology classification is an abnormal finding of the analysis target cell. Accordingly, the identification accuracy of cells having similar morphologies can be more improved.

In the embodiment, the analysis data (80) is generated from an image in which a blood cell having been subjected to staining is captured. More preferably, the staining is selected from Wright's staining, Giemsa staining, Wright-Giemsa staining, and May-Giemsa staining. Accordingly, identification similar to conventional observation under a microscopic can be performed.

The analysis data (80) and training data (75) include information regarding brightness of an analysis target image and a training image, and information regarding at least two types of hue thereof. Accordingly, the identification accuracy can be improved.

Another embodiment of the present disclosure relates to an image analysis apparatus (200) configured to analyze morphology of a cell by use of a deep learning algorithm having a neural network structure. The image analysis apparatus (200) includes a processing unit (10) by which analysis data (80) being generated from an image of an analysis target cell and including information regarding the analysis target cell is input into the deep learning algorithm (60, 61) and a probability that the analysis target cell belongs to each of morphology classifications of a plurality of cells belonging to a predetermined cell group is calculated by use of the deep learning algorithm (60, 61). Preferably, each morphology classification indicates a type of cell. Preferably, each morphology classification indicates an abnormal finding of cell.

Another embodiment of the present disclosure relates to a non-transitory computer readable medium storing programs executable by a processor to perform image analysis for analyzing cell morphology by use of a deep learning algorithm (60, 61) having a neural network structure. The programs cause a processor to execute a process in which analysis data (83) being generated from an image of an analysis target cell and including information regarding the analysis target cell is input into the deep learning algorithm, and a probability that the analysis target cell belongs to each of morphology classifications of a plurality of cells belonging to a predetermined cell group is calculated by use of the deep learning algorithm (60, 61). Preferably, each morphology classification indicates a type of cell. Preferably, each morphology classification indicates an abnormal finding of cell.

Another embodiment of the present disclosure relates to a method for generating a trained deep learning algorithm (60, 61). In the present embodiment, training data including information regarding a cell is inputted into an input layer (50a, 50b) of a neural network (50, 51), and a label value associated with each of morphology classifications of a plurality of cells belonging to a predetermined cell group is inputted as an output layer (51a, 51b). Preferably, each morphology classification indicates a type of cell. Preferably, each morphology classification indicates an abnormal finding of cell.

By use of the image analysis apparatus (200) and the trained deep learning algorithm (60, 61), it is possible to identify the morphological cell type and cell feature, without being affected by the skill of an examiner.

The morphology of each of a plurality of cells included in an analysis image can be identified. As a result, cell examination not affected by the skill of an examiner can be performed.

BRIEF DESCRIPTION OF THE DRAWINGS

FIG. 3 shows an example of label values;

FIG. 17 shows an identification result of the type of cell using a deep learning algorithm; and FIG. 18 shows an identification result of the feature of cell using the deep learning algorithm.

DETAILED DESCRIPTION OF THE PREFERRED EMBODIMENTS

Figure 1:
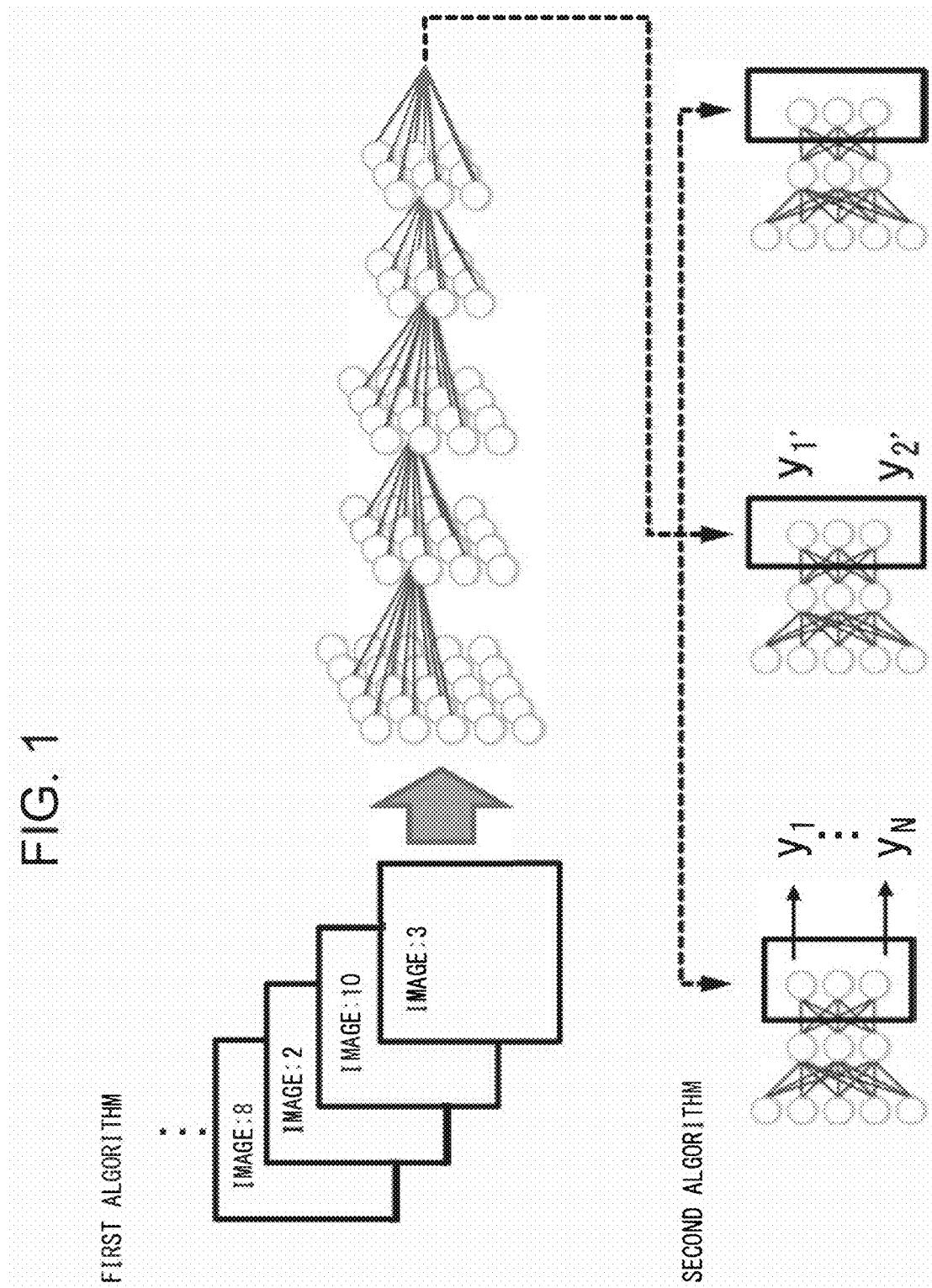
FIG. 1 is a diagram showing the outline of the present disclosure.

Hereinafter, the outline and embodiments of the present disclosure will be described in detail with reference to the attached drawings. In the following description and the drawings, the same reference character denotes the same or like component, and description thereof is omitted.

1. Image Analysis Method

A first embodiment of the present disclosure relates to an image analysis method for analyzing cell morphology. In the image analysis method, analysis data including information regarding an analysis target cell is inputted to a classifier that includes a deep learning algorithm having a neural network structure. The classifier calculates the probability that the analysis target cell belongs to each of morphology classifications of a plurality of cells belonging to a predetermined cell group. Preferably, the image analysis method further includes identifying, on the basis of the probability, which of the morphology classifications of the plurality of cells belonging to the predetermined cell group corresponds to the analysis target cell.

In the first embodiment, the analysis target cell belongs to a predetermined cell group. The predetermined cell group is a group of cells that form each organ in the body of a mammal or a bird. The predetermined cell group, in a normal state, includes a plurality of types of cells morphologically classified through histological microscopic observation or cytological microscopic observation. The morphological classification (also referred to as "morphology classification") includes classification of the type of cell and classification of morphological feature of cell. Preferably, the analysis target cell is a group of cells that belong to a predetermined cell lineage that belongs to a predetermined cell group. The predetermined cell lineage is a cell group that belongs to the same lineage that has differentiated from one type of tissue stem cell. Preferably, the predetermined cell lineage is the hematopoietic system, and more preferably, cells in blood (also referred to as blood cells).

In a conventional method, a human observes, in a microscopic bright field, a preparation having been subjected to bright field staining, whereby hematopoietic cells are morphologically classified. Preferably, the staining is selected from Wright's staining, Giemsa staining, Wright-Giemsa staining, and May-Giemsa staining. More preferably, the staining is May-Giemsa staining. The preparation is not restricted as long as the preparation allows individual observation of the morphology of respective cells belonging to a predetermined cell group. Examples of the preparation include a smear preparation and an impression preparation. Preferably, the preparation is a smear preparation using peripheral blood or bone marrow as a sample, and more preferably, is a smear preparation of peripheral blood.

In morphological classification, the type of blood cells includes neutrophil, including segmented neutrophil and band neutrophil; metamyelocyte; bone marrow cell; promyelocyte; blast; lymphocyte; plasma cell; atypical lymphocyte; monocyte, eosinophil, basophil, erythroblast (which is nucleated erythrocyte and includes proerythroblast, basophilic erythroblast, polychromatic erythroblast, orthochromatic erythroblast, promegaloblast, basophilic megaloblast, polychromatic megaloblast, and orthochromatic megaloblast); giant platelet; platelet aggregate; megakaryocyte (which is nucleated megakaryocyte and includes micromegakaryocyte); and the like.

The predetermined cell group may include abnormal cells that exhibit morphologically abnormal findings, in addition to normal cells. Abnormality appears as a morphologically classified cell feature. Examples of abnormal cells are cells that emerge when a person has a predetermined disease, and are tumor cells, for example. In the case of the hematopoietic system, the predetermined disease is a disease selected from the group consisting of myelodysplastic syndromes, leukemia (including acute myeloblastic leukemia, acute myeloblastic leukemia, acute promyelocytic leukemia, acute myelomonocytic leukemia, acute monocytic leukemia, erythroleukemia, acute megakaryoblastic leukemia, acute myeloid leukemia, acute lymphoblastic leukemia, lymphoblastic leukemia, chronic myelogenous leukemia, chronic lymphocytic leukemia, and the like), malignant lymphoma (Hodgkin's lymphoma, non-Hodgkin's lymphoma, and the like), and multiple myeloma. In the case of the hematopoietic system, the cell having an abnormal finding is a cell that has at least one type of morphological feature selected from the group consisting of: morphological nucleus abnormality; presence of vacuole, granule morphological abnormality; granule distribution abnormality; presence of abnormal granule; cell size abnormality; presence of inclusion body; and bare nucleus.

Examples of the morphological nucleus abnormality include nucleus becoming small, nucleus becoming large, nucleus becoming hypersegmented, nucleus that should be segmented in a normal state but has not been segmented (including pseudo-Pelger anomaly and the like), presence of vacuole, swelled nucleolus, cleaved nucleus, a single cell that should have one nucleus but has the anomaly of having two, and the like.

Examples of abnormality in the morphology of an entire cell include presence of vacuole in cytoplasm (also referred to as vacuolar degeneration), morphological abnormality in granule (such as azurophil granule, neturophil granule, eosinophil granule, and basophil granule), presence of abnormality in distribution (excess, decrease, or disappearance) of the above-mentioned granules, presence of abnormal granule (for example, toxic granule), cell size abnormality (larger or smaller than normal cell), presence of inclusion body (Dohle body, Auer body, and the like), bare nucleus, and the like.

<Outline of Image Analysis Method>

The outline of an image analysis method is described with reference to FIG. 1.

A classifier used in the image analysis method includes a plurality of deep learning algorithms (also simply referred to as "algorithm") each having a neural network structure. Preferably, the classifier includes a first deep learning algorithm (50) and a second deep learning algorithm (51). The first deep learning algorithm (50) extracts the feature quantity of a cell, and the second deep learning algorithm (51) identifies the analysis target cell on the basis of the feature quantity extracted by the first deep learning algorithm. More preferably, at the downstream of the first deep learning algorithm as shown in FIG. 1, in addition to the second deep learning algorithm, the classifier may include a plurality of types of deep learning algorithms (which are sometimes numbered as the second, the third, the fourth, the fifth, . . . , the i-th) having been trained in accordance with the objective of the identification. For example, the second deep learning algorithm identifies the type of cell based on the morphological classification described above. For example, the third deep learning algorithm identifies the feature of cell, for each feature, based on the morphological classification described above. Preferably, the first deep learning algorithm is a convolution connect neural network, and the second deep learning algorithm and thereafter at the downstream of the first deep learning algorithm are each a full connect neural network.

Next, a method for generating training data 75 and an image analysis method are described with reference to the examples shown in FIG. 2 to FIG. 4. In the following, for convenience of description, the first deep learning algorithm and the second deep learning algorithm are used.

<Generation of Training Data>

A training image 70 that is used for training a deep learning algorithm is a captured image of a cell whose type of cell (also referred to as cell type) and feature of cell (also referred to as cell feature) based on morphological classification that corresponds to the analysis target cell are known. Preferably, the preparation used for capturing the training image 70 is created from a sample that contains the same type of cells as the analysis target cell, by a preparation creation method and a staining method similar to those for a preparation that includes the analysis target cell. Preferably, the training image 70 is captured in a condition similar to the image capturing condition for the analysis target cell.

The training image 70 can be obtained in advance for each cell by use of, for example, a known light microscope or an imaging apparatus such as a virtual slide scanner. In the example shown in FIG. 2, the training image 70 is obtained by reducing a raw image captured in 360 pixels×365 pixels by Sysmex DI-60 into 255 pixels×255 pixels. However, this reduction is not mandatory. The number of pixels of the training image 70 is not restricted as long as analysis can be performed, but the number of pixels of one side thereof is preferably greater than 100. In the example shown in FIG. 2, erythrocytes are present around the neutrophil, but the image may be trimmed such that only the target cell is included in the image. If, at least, one cell, for which training is to be performed (erythrocytes, and platelets of normal sizes may be included), is included in one image and the pixels corresponding to the cell, for which training is to be performed, exist by about ⅑ of the total pixels of the image, the image can be used as the training image 70.

For example, in the present embodiment, preferably, image capturing by the imaging apparatus is performed in RGB colors, CMY colors, or the like. Preferably, as for a color image, the darkness/paleness or brightness of each of primary colors, such as red, green, and blue, or cyan, magenta, and yellow, is expressed by a 24 bit value (8 bits×3 colors). It is sufficient that the training image 70 includes at least one hue, and the darkness/paleness or brightness of the hue, but more preferably, includes at least two hues and the darkness/paleness or brightness of each hue. Information including hue and the darkness/paleness or brightness of the hue is also called tone.

Next, information of tone of each pixel is converted from, for example, RGB colors into a format that includes information of brightness and information of hue. Examples of the format that includes information of brightness and information of hue include YUV (YCbCr, YPbPr, YIQ, and the like). Here, an example of converting to a YCbCr format is described. Since the training image is in RGB colors, conversion into brightness 72Y, first hue (for example, bluish color) 72Cb, and second hue (for example, reddish color) 72Cr is performed. Conversion from RGB to YCbCr can be performed by a known method. For example, conversion from RGB to YCbCr can be performed according to International Standard ITU-R BT.601. The brightness 72Y, the first hue 72Cb, and the second hue 72Cr after the conversion can be each expressed as a matrix of gradation values as shown in FIG. 2 (hereinafter, also referred to as tone matrices 72y, 72cb, and 72cr). The brightness 72Y, the first hue 72Cb, and the second hue 72Cr are each expressed in 256 gradations consisting of 0 to 255 gradations. Here, instead of the brightness 72Y, the first hue 72Cb, and the second hue 72Cr, the training image may be converted into the three primary colors of red R, green G, and blue B, or the three primary colors of pigment of cyan C, magenta M, and yellow Y.

Next, on the basis of the tone matrices 72y, 72cb, and 72cr, for each pixel, tone vector data 74 is generated by combining three gradation values of the brightness 72y, the first hue 72cb, and the second hue 72cr.

Figure 2:
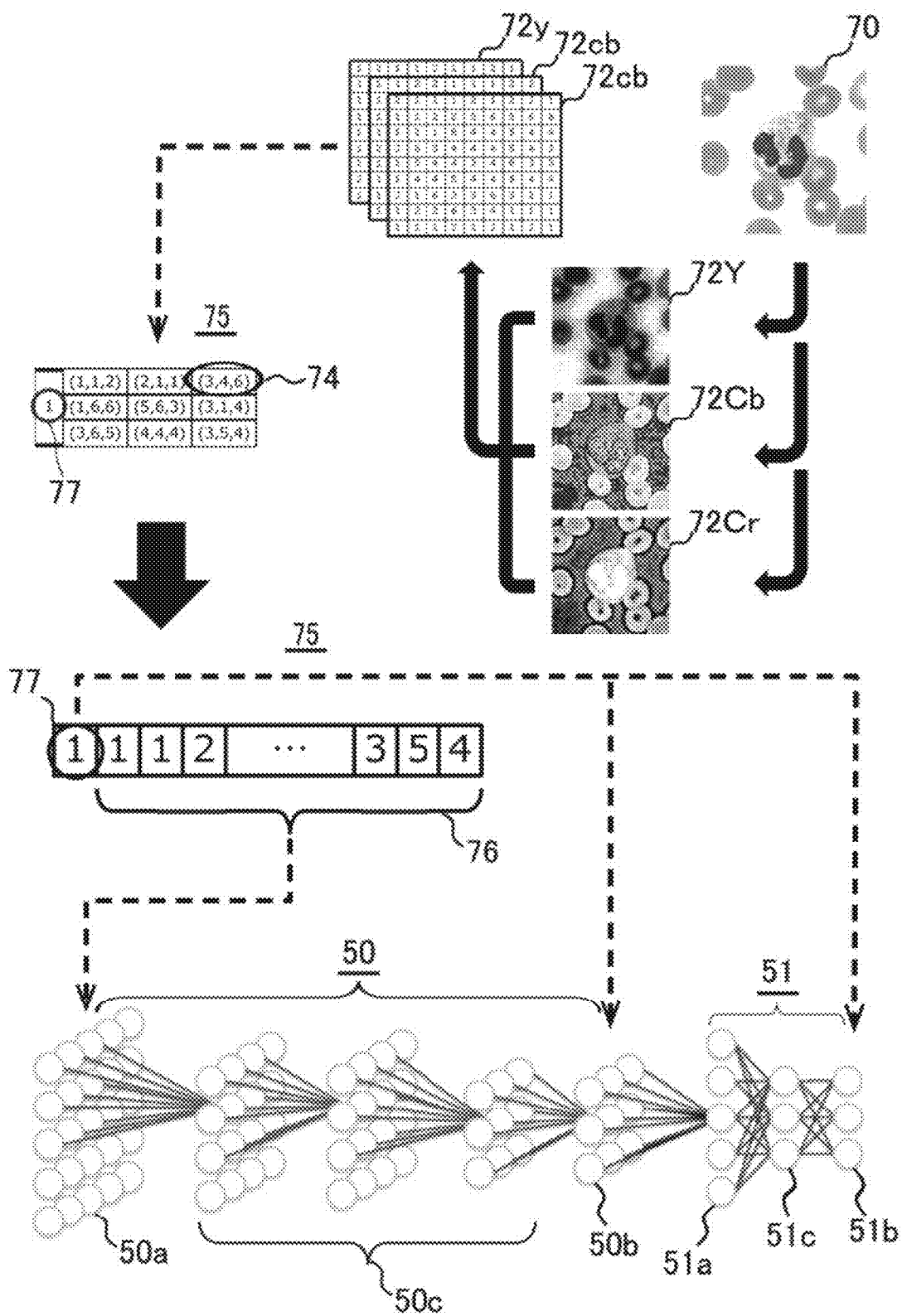
FIG. 2 is a schematic diagram showing an example of a procedure for generating training data, and a procedure for training a first deep learning algorithm and a second deep learning algorithm.

Next, for example, since the training image 70 in FIG. 2 is of a segmented neutrophil, each tone vector data 74 generated from the training image 70 in FIG. 2 is provided with "1" as a label value 77 which indicates that the image is of a segmented neutrophil, whereby training data 75 is obtained. In FIG. 2, for convenience, the training data 75 is expressed by 3 pixels×3 pixels. However, in actuality, the tone vector data exists by the number of pixels that have been obtained at the capture of the image of the training data 70.

FIG. 3 shows an example of the label value 77. As the label value, a label value 77 that is different according to the type of cell and the presence/absence of a feature of each cell is provided.

<Outline of Deep Learning>

Using FIG. 2 as an example, the outline of neural network training is described. Preferably, both a first neural network 50 and a second neural network 51 are convolution neural networks. The number of nodes at an input layer 50a in the first neural network 50 corresponds to the product of the number of pixels of the training data 75 that is inputted, and the number of brightness and hue (for example, in the above example, three, i.e., the brightness 72y, the first hue 72cb, and the second hue 72cr) included in the image. The tone vector data 74 is inputted, as a set 76 thereof, to the input layer 50a of the first neural network 50. Using the label value 77 of each pixel of the training data 75 as an output layer 50b of the first neural network, the first neural network 50 is trained.

On the basis of the training data 75, the first neural network 50 extracts feature quantities with respect to the morphological cell type or cell feature described above. The output layer 50b of the first neural network outputs a result reflecting these feature quantities. Each result outputted from a softmax function of the first neural network 50 is inputted in an input layer 51a of the second neural network 51. Since cells that belong to a predetermined cell lineage have similar cell morphologies, a deep learning algorithm 51 having the second neural network 51 is further specialized in identification of a morphologically specific cell type or morphologically specific cell features, so that the deep learning algorithm is trained. Therefore, the label value 77 of the training data 75 is also inputted to the output layer of the second neural network. Reference characters 50c and 51c in FIG. 2 represent middle layers.

The first deep learning algorithm 60 having the thus-trained first neural network 60, and the second deep learning algorithm 61 having the thus-trained second neural network 61 are combined to be used as a classifier for identifying which of the morphologically classified types of a plurality of cells belonging to a predetermined cell group corresponds to the analysis target cell.

<Image Analysis Method>

Figure 4:
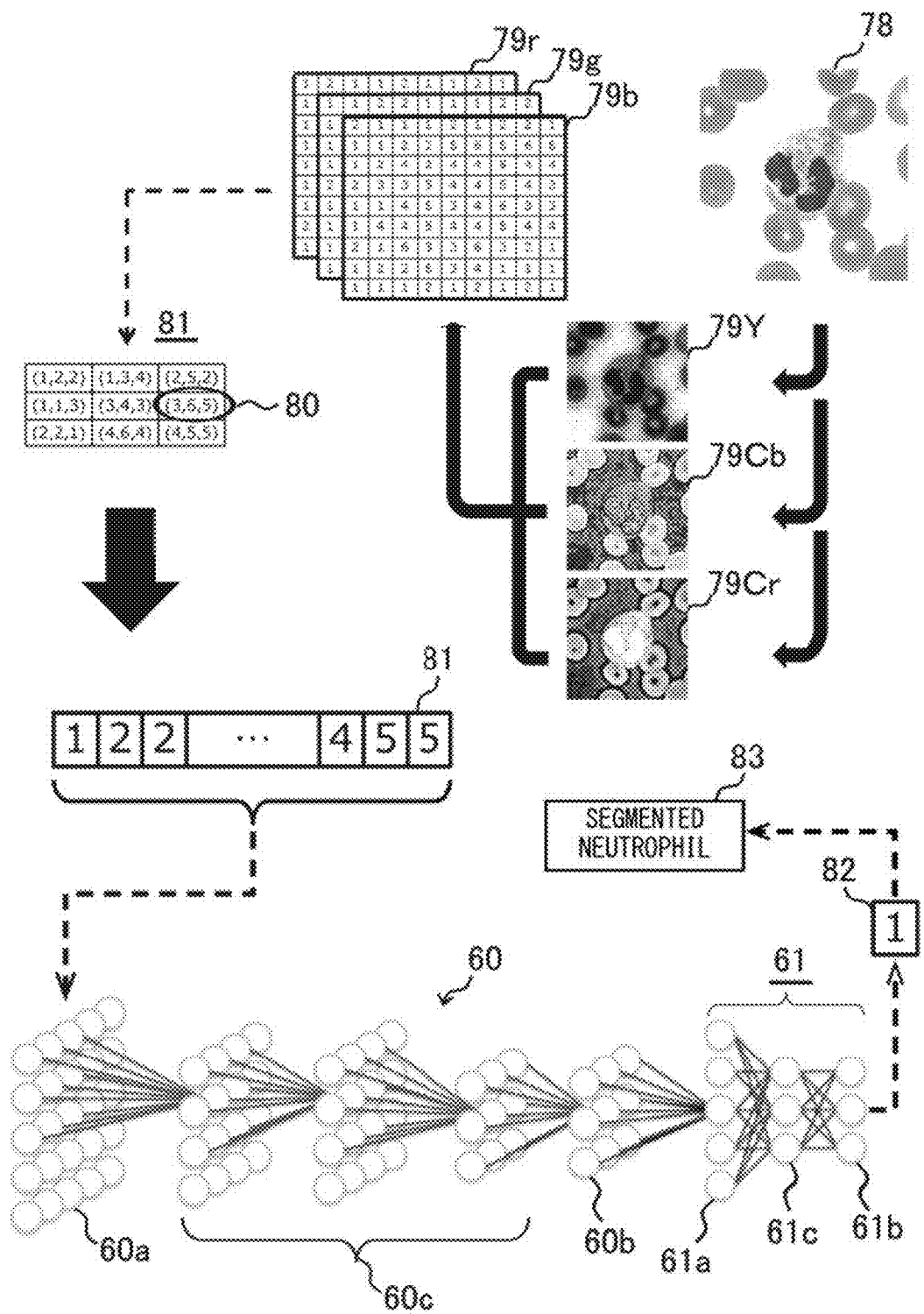
FIG. 4 is a schematic diagram showing an example of a procedure for generating analysis data and a procedure for identifying a cell using a deep learning algorithm.

FIG. 4 shows an example of an image analysis method. In the image analysis method, analysis data 81 is generated from an analysis image 78 in which the analysis target cell is captured. The analysis image 78 is an image in which the analysis target cell is captured. The analysis image 78 can be obtained by use of, for example, a known light microscope or a known imaging apparatus such as a virtual slide scanner. In the example shown in FIG. 4, the analysis image 78 is obtained by reducing a raw image captured in 360 pixels× 365 pixels by Sysmex DI-60 into 255 pixels×255 pixels, as in the case of the training image 70. However, this reduction is not mandatory. The number of pixels of the analysis image 78 is not restricted as long as analysis can be performed, but the number of pixels of one side thereof is preferably greater than 100. In the example shown in FIG. 4, erythrocytes are present around the segmented neutrophil, but the image may be trimmed such that only the target cell is included in the image. If, at least, one analysis target cell is included in one image (erythrocytes, and platelets of normal sizes may be included) and the pixels corresponding to the analysis target cell exist by about ⅑ of the total pixels of the image, the image can be used as the analysis image 78.

For example, in the present embodiment, preferably, image capturing by the imaging apparatus is performed in RGB colors, CMY colors, or the like. Preferably, as for a color image, the darkness/paleness or brightness of each of primary colors, such as red, green, and blue, or cyan, magenta, and yellow, is expressed by a 24 bit value (8 bits×3 colors). It is sufficient that the analysis image 78 includes at least one hue, and the darkness/paleness or brightness of the hue, but more preferably, includes at least two hues and the darkness/paleness or brightness of each hue. Information including hue and the darkness/paleness or brightness of the hue is also called tone.

For example, the format of RGB colors is converted into a format that includes information of brightness and information of hue. Examples of the format that includes information of brightness and information of hue include YUV (YCbCr, YPbPr, YIQ, and the like). Here, an example of converting to a YCbCr format is described. Since the analysis image is in RGB colors, conversion into brightness 79Y, first hue (for example, bluish color) 79Cb, and second hue (for example, reddish color) 79Cr is performed. Conversion from RGB to YCbCr can be performed by a known method. For example, conversion from RGB to YCbCr can be performed according to International Standard ITU-R BT.601. The brightness 79Y, the first hue 79Cb, and the second hue 79Cr after the conversion can be each expressed as a matrix of gradation values as shown in FIG. 2 (hereinafter, also referred to as tone matrices 79$y$, 79$cb$, 79$cr$). The brightness 72Y, the first hue 72Cb, and the second hue 72Cr are each expressed in 256 gradations consisting of 0 to 255 gradations. Here, instead of the brightness 79Y, the first hue 79Cb, and the second hue 79Cr, the analysis image may be converted into the three primary colors of red R, green G, and blue B, or the three primary colors of pigment of cyan C, magenta M, and yellow Y.

Next, on the basis of the tone matrices 79$y$, 79$cb$, and 79$cr$, for each pixel, tone vector data 80 is generated by combining three gradation values of the brightness 79$y$, the first hue 79$cb$, and the second hue 79$cr$. A set of the tone vector data 80 generated from one analysis image 78 is generated as the analysis data 81.

Preferably, the generation of the analysis data 81 and the generation of the training data 75 have, at least, the same image capturing condition and the same condition of generating, from each image, vector data to be inputted into neural networks.

The analysis data 81 is inputted to an input layer 60$a$ of the first neural network 60 forming the first deep learning algorithm 60 having been trained. The first deep learning algorithm extracts feature quantities from the analysis data 81, and outputs the result from an output layer 60$b$ of the first neural network 60. The value outputted from the output layer 60$b$ is a probability that the analysis target cell included in the analysis image belongs to each of the morphological cell classification or feature inputted as the training data.

Next, the result outputted from the output layer 60$b$ is inputted to an input layer 61$a$ of the second neural network 61 forming the second deep learning algorithm 61 having been trained. On the basis of the inputted feature quantities, the second deep learning algorithm 61 outputs, from an output layer 61$b$, a probability that the analysis target cell included in the analysis image belongs to each of the morphological cell classification or feature inputted as the training data. Further, it is determined that the analysis target cell included in the analysis image belongs to a morphological classification that has the highest value in the probabilities, and a label value associated with the morphological cell type or cell feature is outputted. The label value itself, or data obtained by replacing the label value with information indicating the presence/absence of a morphological cell type or cell feature (for example, a term), is outputted as data 83 regarding the cell morphology. In FIG. 4, from the analysis data 81, a label value "1" is outputted by the classifier as a label value 82 having the highest possibility, and character data "segmented neutrophil" corresponding to this label value is outputted as the data 83 regarding the cell morphology.

Reference characters 60$c$ and 61$c$ in FIG. 4 represent middle layers.

2. Image Analysis System 1

<Configuration of Image Analysis System 1>

A second embodiment of the present disclosure relates to an image analysis system.

Figure 5:
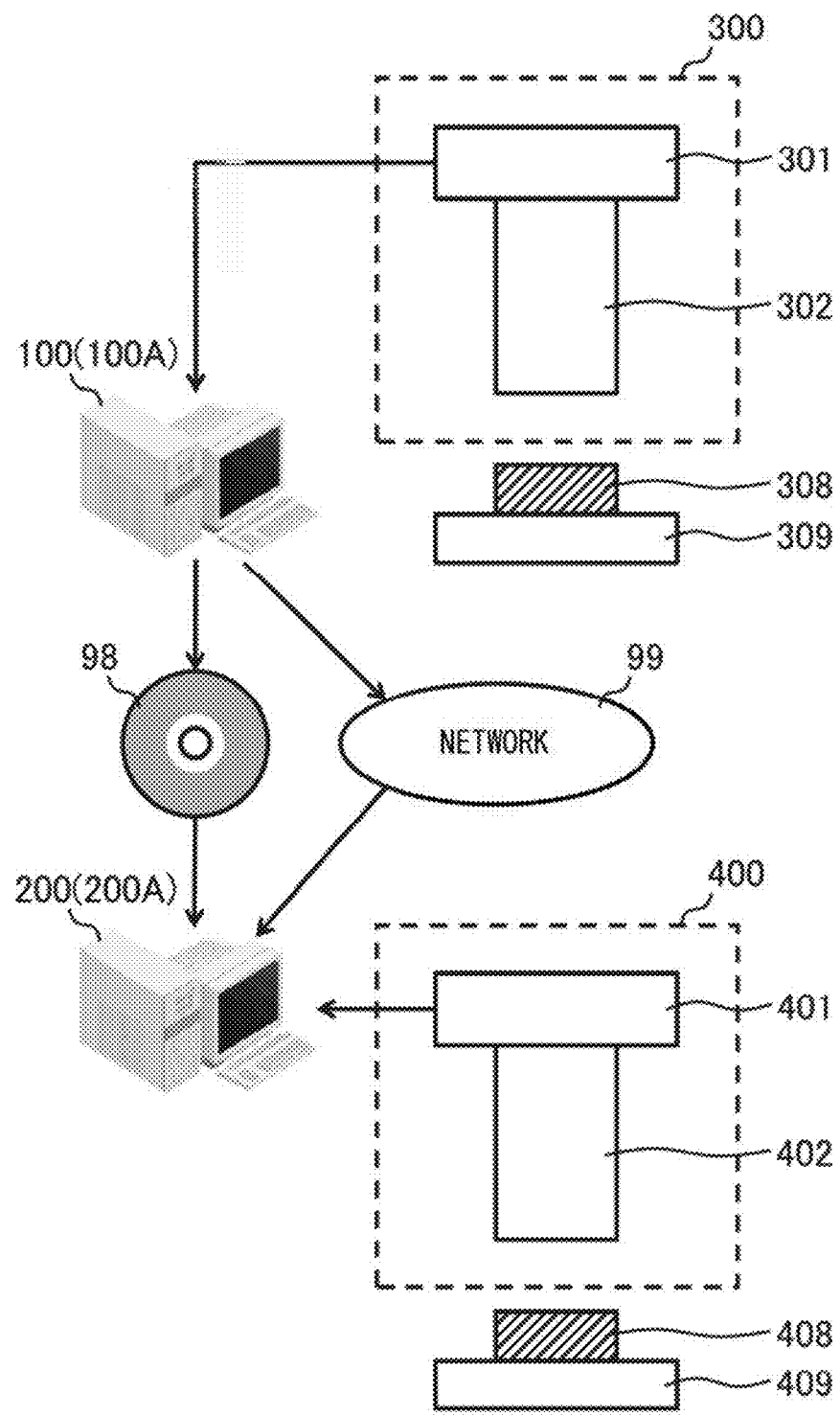
FIG. 5 is a schematic diagram showing a configuration example of an image analysis system 1.

With reference to FIG. 5, an image analysis system according to the second embodiment includes a deep learning apparatus 100A and an image analysis apparatus 200A. A vendor-side apparatus 100 operates as the deep learning apparatus 100A and a user-side apparatus 200 operates as the image analysis apparatus 200A. The deep learning apparatus 100A causes the neural network 50 to learn by use of training data, and provides a user with the deep learning algorithm 60 having been trained by use of the training data. The deep learning algorithm configured by the neural network 60 having learned is provided to the image analysis apparatus 200A from the deep learning apparatus 100A through a storage medium 98 or a network 99. The image analysis apparatus 200A analyzes an image of the analysis target by use of the deep learning algorithm configured by the neural network 60 having learned.

The deep learning apparatus 100A is implemented as a general purpose computer, for example, and performs a deep learning process on the basis of a flow chart described later. The image analysis apparatus 200A is implemented as a general purpose computer, for example, and performs an image analysis process on the basis of a flow chart described later. The storage medium 98 is a computer-readable, non-transitory, and tangible storage medium, such as a DVD-ROM, or a USB memory.

The deep learning apparatus 100A is connected to an imaging apparatus 300. The imaging apparatus 300 includes an image pickup device 301 and a fluorescence microscope 302, and captures a bright field image of a learning preparation 308 set on a stage 309. The training preparation 308 has been subjected to the staining described above. The deep learning apparatus 100A obtains the training image 70 captured by the imaging apparatus 300.

The image analysis apparatus 200A is connected to an imaging apparatus 400. The imaging apparatus 400 includes an image pickup device 401 and a fluorescence microscope 402, and captures a bright field image of an analysis target preparation 408 set on a stage 409. The analysis target preparation 408 has been stained in advance as described above. The image analysis apparatus 200A obtains an analysis target image 78 captured by the imaging apparatus 400.

As the imaging apparatus 300, 400, a known light microscope, a known virtual slide scanner, or the like that has a function of capturing images of preparations can be used.

<Hardware Configuration of Deep Learning Apparatus>

Figure 6:
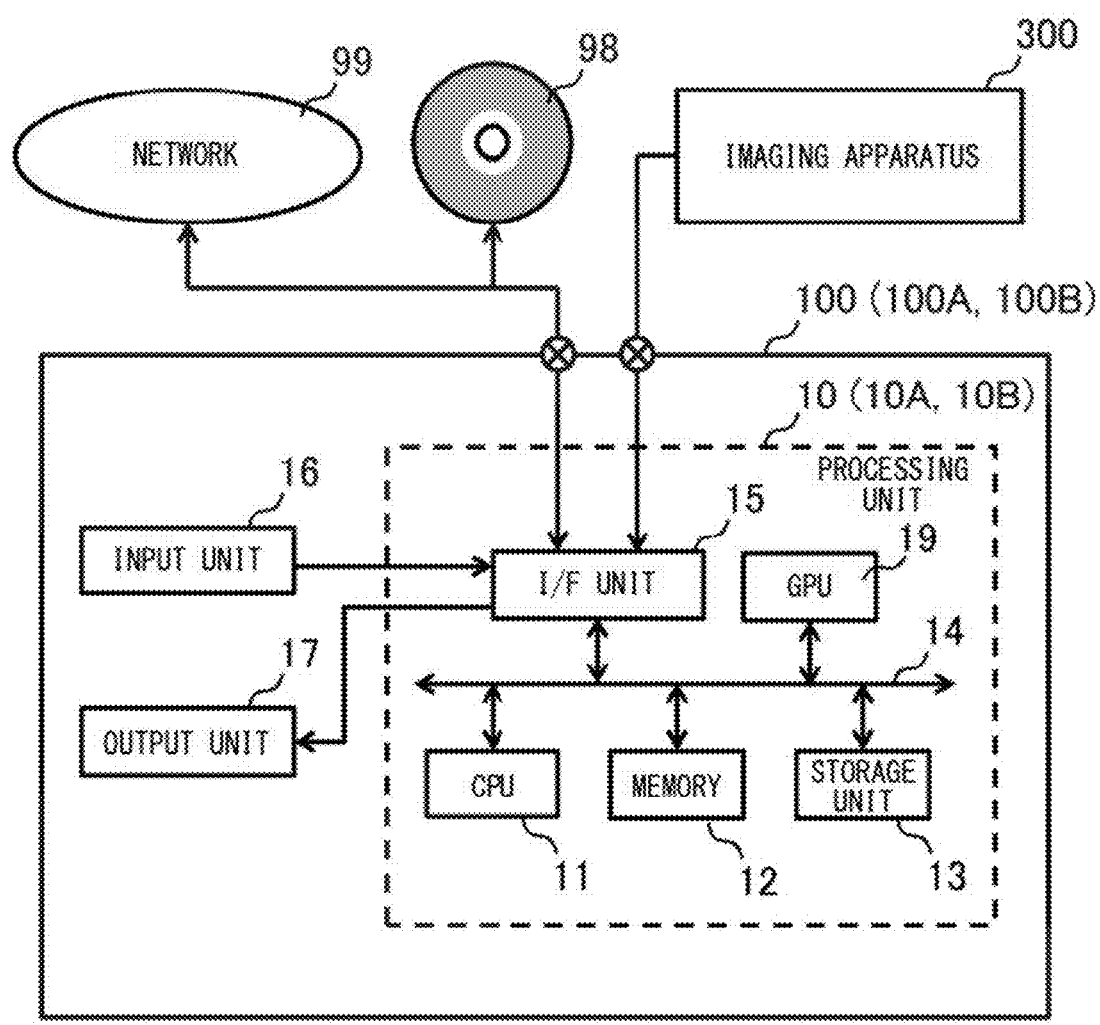
FIG. 6 is a block diagram showing an example of a hardware configuration of a vendor-side apparatus 100.

With reference to FIG. 6, the vendor-side apparatus 100 (deep learning apparatus 100A, deep learning apparatus 100B) includes a processing unit 10 (10A, 10B), an input unit 16, and an output unit 17.

The processing unit 10 includes a CPU (Central Processing Unit) 11 which performs data processing described later, a memory 12 to be used as a work area for data processing, a storage unit 13 which stores therein a program and process data described later, a bus 14 which transmits data between units, an interface unit 15 which inputs/outputs data with respect to an external apparatus, and a GPU (Graphics Processing Unit) 19. The input unit 16 and the output unit 17 are connected to the processing unit 10. For example, the input unit 16 is an input device such as a keyboard or a mouse, and the output unit 17 is a display device such as a liquid crystal display. The GPU19 functions as an accelerator that assists arithmetic processing (for example, parallel arithmetic processing) performed by the CPU 11. That is, the processing performed by the CPU 11 described below also includes processing performed by the CPU 11 using the GPU19 as an accelerator.

In order to perform the process of each step described below with reference to FIG. 8, the processing unit 10 has previously stored, in the storage unit 13, a program according to the present disclosure and the neural network 50 before being trained, in an execute form, for example. The execute form is a form generated as a result of a programming language being converted by a compiler, for example. The processing unit 10 uses the program stored in the storage unit 13, to perform a training process for the first neural network 50 and the second neural network 51 which are not yet trained.

In the description below, unless otherwise specified, the process performed by the processing unit 10 means a process performed by the CPU 11 on the basis of the program and the neural network 50 stored in the storage unit 13 or the memory 12. The CPU 11 temporarily stores necessary data (such as intermediate data being processed) using the memory 12 as a work area, and stores as appropriate, in the storage unit 13, data to be saved for a long time such as arithmetic calculation results.

<Hardware Configuration of Image Analysis Apparatus>

Figure 7:
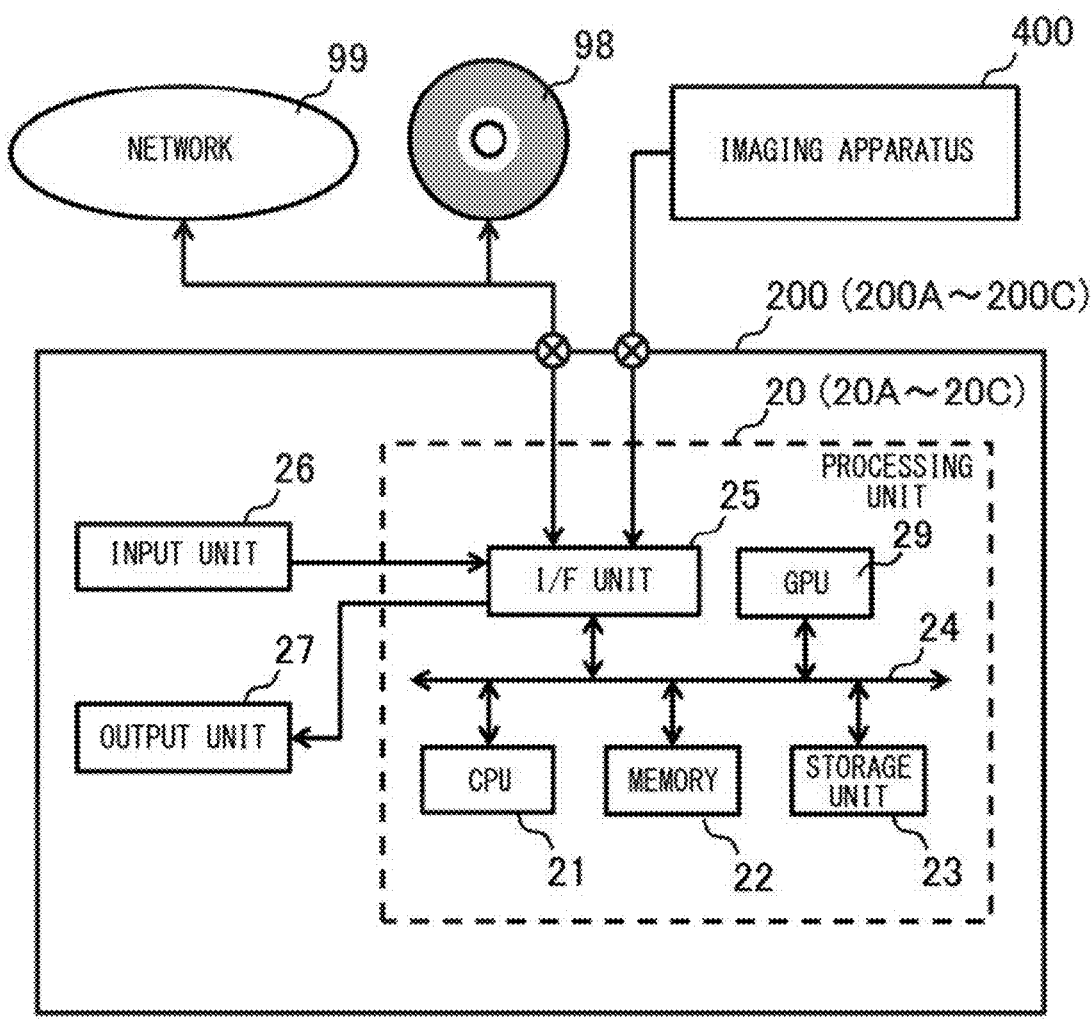
FIG. 7 is a block diagram showing an example of a hardware configuration of a user-side apparatus 200.

With reference to FIG. 7, the user-side apparatus 200 (image analysis apparatus 200A, image analysis apparatus 200B, image analysis apparatus 200C) includes a processing unit 20 (20A, 20B, 20C), an input unit 26, and an output unit 27.

The processing unit 20 includes a CPU (Central Processing Unit) 21 which performs data processing described later, a memory 22 to be used as a work area for data processing, a storage unit 23 which stores therein a program and process data described later, a bus 24 which transmits data between units, an interface unit 25 which inputs/outputs data with respect to an external apparatus, and a GPU (Graphics Processing Unit) 29. The input unit 26 and the output unit 27 are connected to the processing unit 20. For example, the input unit 26 is an input device such as a keyboard or a mouse, and the output unit 27 is a display device such as a liquid crystal display. The GPU 29 functions as an accelerator that assists arithmetic processing (for example, parallel arithmetic processing) performed by the CPU 21. That is, the processing performed by the CPU 21 in the description below also includes processing performed by the CPU 21 using the GPU 29 as an accelerator.

In order to perform the process of each step in the image analysis process below, the processing unit 20 has previously stored, in the storage unit 23, a program according to the present disclosure and the deep learning algorithm 60 of the neural network structure having been trained, in an execute form, for example. The execute form is a form generated as a result of a programming language being converted by a compiler, for example. The processing unit 20 uses the second deep learning algorithm 61, and the first deep learning algorithm 60 and the program stored in the storage unit 23, to perform a process.

In the description below, unless otherwise specified, the process performed by the processing unit 20 means a process performed by the CPU 21 of the processing unit 20 in actuality, on the basis of the program and the deep learning algorithm 60 stored in the storage unit 23 or the memory 22. The CPU 21 temporarily stores necessary data (such as intermediate data being processed) using the memory 22 as a work area, and stores as appropriate, in the storage unit 23, data to be saved for a long time such as arithmetic calculation results.

<Function Block and Processing Procedure>

(Deep Learning Process)

Figure 8:
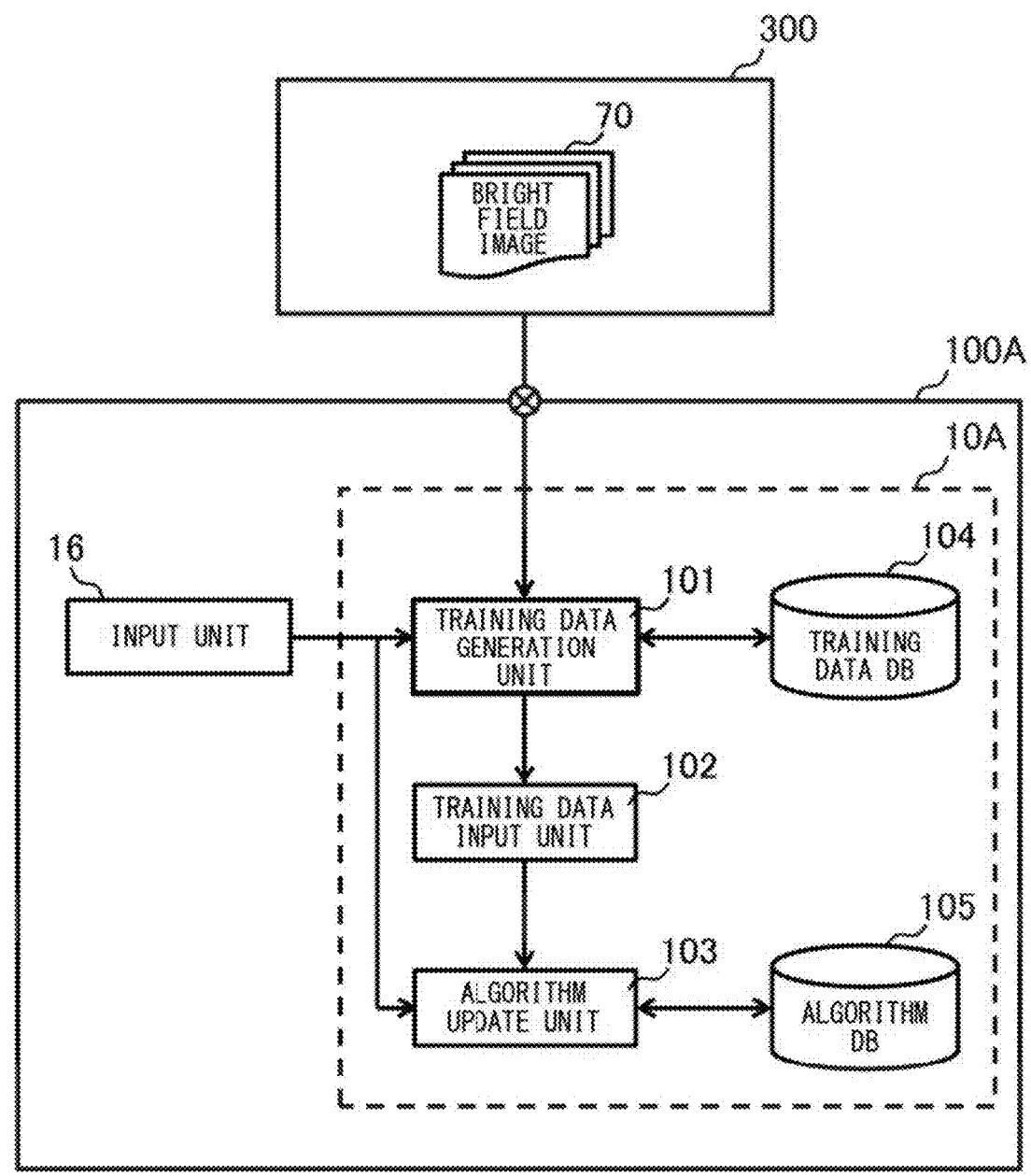
FIG. 8 is a block diagram for describing an example of the function of a deep learning apparatus 100A.

With reference to FIG. 8, the processing unit 10A of the deep learning apparatus 100A according to the present embodiment includes a training data generation unit 101, a training data input unit 102, and an algorithm update unit 103. These function blocks are realized when a program for causing a computer to execute the deep learning process is installed in the storage unit 13 or the memory 12 of the processing unit 10A, and the program is executed by the CPU 11. A training data database (DB) 104 and an algorithm database (DB) 105 are stored in the storage unit 13 or the memory 12 of the processing unit 10A.

Each training image 70 is captured in advance by the imaging apparatus 300 and is stored in advance in the storage unit 13 or the memory 12 of the processing unit 10A. The first deep learning algorithm 50 and the second deep learning algorithm 51 are stored in advance in the algorithm database 105, in association with the morphological cell type or cell feature to which the analysis target cell belongs, for example.

Figure 9:
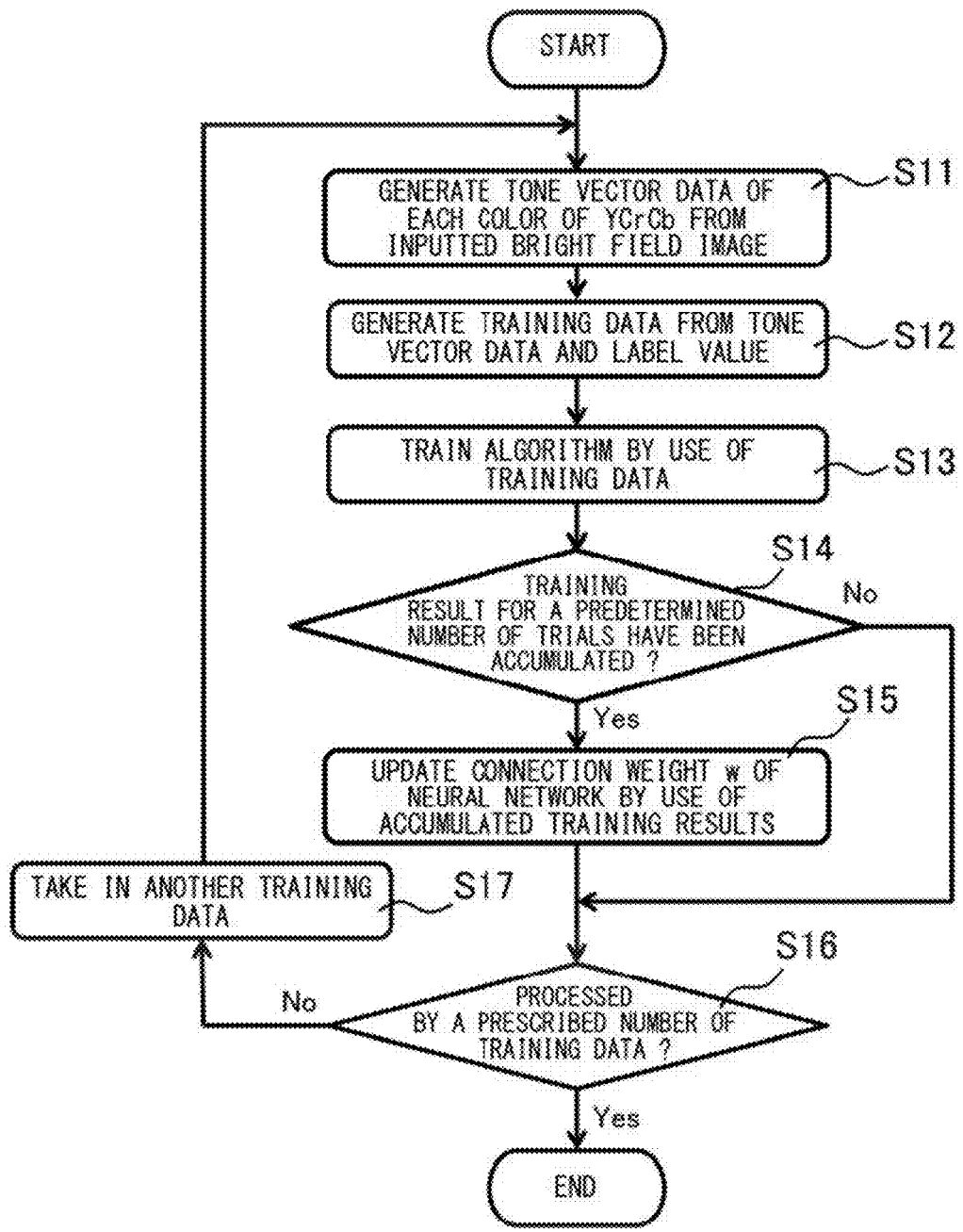
FIG. 9 is a flow chart showing an example of the flow of a deep learning process.

The processing unit 10A of the deep learning apparatus 100A performs the process shown in FIG. 9. With reference to the function blocks shown in FIG. 8, the processes of steps S11, S12, S16, and S17 are performed by the training data generation unit 101. The process of step S13 is performed by the training data input unit 102. The processes of steps S14 and S15 are performed by the algorithm update unit 103.

An example of the deep learning process performed by the processing unit 10A is described with reference to FIG. 9.

First, the processing unit 10A obtains training images 70. Each training image 70 is obtained via the I/F unit 15 through an operation by an operator, from the imaging apparatus 300, from the storage medium 98, or via a network. When the training image 70 is obtained, information regarding which of the morphologically classified cell type and/or the morphological cell feature is indicated by the training image 70 is also obtained. The information regarding which of the morphologically classified cell type and/or the morphological cell feature is indicated may be associated with the training image 70, or may be inputted by the operator through the input unit 16.

In step S11, the processing unit 10A converts the obtained training image 70 into brightness Y, first hue Cb, and second hue Cr, and generates tone vector data 74 in accordance with the procedure described in the training data generation method above.

In step S12, the processing unit 10A provides a label value that corresponds to the tone vector data 74, on the basis of the information regarding which of the morphologically classified cell type and/or the cell feature in morphological classification is being indicated, the information being associated with the training image 70, and the label value associated with the morphologically classified cell type or the cell feature in morphological classification stored in the memory 12 or the storage unit 13. In this manner, the processing unit 10A generates the training data 75.

In step S13 shown in FIG. 9, the processing unit 10A trains the first neural network 50 and the second neural network 51 by use of the training data 75. Training results of the first neural network 50 and the second neural network 51 are accumulated every time training is performed by use of a plurality of the training data 75.

In the image analysis method according to the present embodiment, the convolution neural network is used, and the stochastic gradient descent method is used. Therefore, in step S14, the processing unit 10A determines whether training results for a predetermined number of trials have been accumulated. When the training results for the predetermined number of trials have been accumulated (YES), the processing unit 10A advances to the process in step S15, and when the training results for the predetermined number of trials have not been accumulated (NO), the processing unit 10A advances to the process in step S16.

Next, when the training results for the predetermined number of trials have been accumulated, the processing unit 10A updates, in step S15, connection weights w of the first neural network 50 and the second neural network 51, by use of the training results accumulated in step S13. In the image analysis method according to the present embodiment, since the stochastic gradient descent method is used, the connection weights w of the first neural network 50 and the second neural network 51 are updated at a stage where learning results for the predetermined number of trials have been accumulated. Specifically, the process of updating the connection weights w is a process of performing calculation according to the gradient descent method, expressed in Formula 11 and Formula 12 described later.

In step S16, the processing unit 10A determines whether or not the first neural network 50 and the second neural network 51 have been trained by a prescribed number of training data 75. When training has been performed by the prescribed number of training data 75 (YES), the deep learning process ends.

When the first neural network 50 and the second neural network 51 have not been trained by the prescribed number of training data 75 (NO), the processing unit 10A advances from step S16 to step S17, and performs the processes from step S11 to step S16 with respect to the next training image 70.

In accordance with the process described above, the first neural network 50 and the second neural network 51 are trained and the first deep learning algorithm 60 and the second deep learning algorithm 61 are obtained.

(Structure of Neural Network)

Figure 10A:
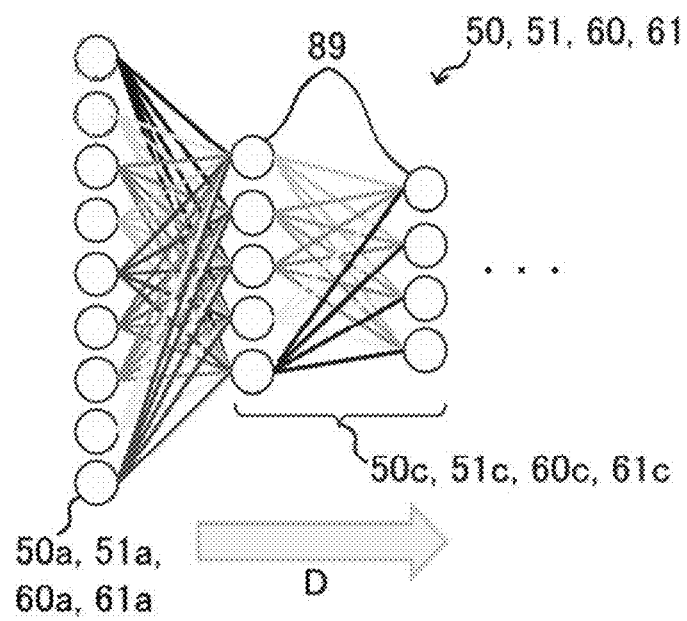
FIG. 10A is a schematic diagram for describing a neural network.

As described above, the present embodiment uses the convolution neural network. FIG. 10A shows an example of the structures of the first neural network 50 and the second neural network 51. The first neural network 50 and the second neural network 51 include: the input layers 50a, 51a; the output layers 50b, 51b; and the middle layers 50c, 51c between the input layers 50a, 51a and the output layers 50b, 51b. Each middle layer 50c, 51c is composed of a plurality of layers. The number of layers forming the middle layer 50c, 51c can be 5 or greater, for example.

In the first neural network 50 and the second neural network 51, a plurality of nodes 89 arranged in a layered manner are connected between layers. Accordingly, information propagates only in one direction indicated by the arrow D in the figure, from the input side layer 50a, 51a to the output side layer 50b, 51b.

(Calculation at Each Node)

Figure 10B:
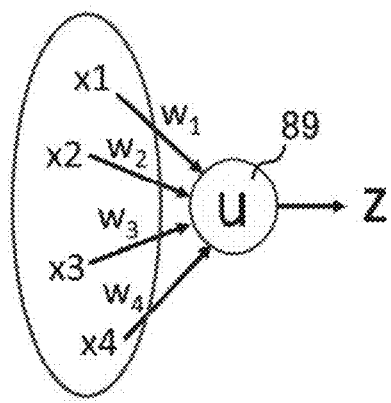
FIG. 10B is a schematic diagram for describing the neural network.

FIG. 10B is a schematic diagram illustrating calculation performed at each node. The node 89 receives a plurality of inputs and calculates one output (z). In the case of the example shown in FIG. 10B, the node 89 receives four inputs. The total input (u) received by the node 89 is expressed by Formula 1 below.

[Math. 1]

$$u = w_1 x_1 + w_2 x_2 + w_3 x_3 + w_4 x_4 + b \qquad \text{(Formula 1)}$$

Each input is multiplied by a different weight. In Formula 1, b is a value called bias. The output (z) of the node serves as an output of a predetermined function f with respect to the total input (u) expressed by Formula 1, and is expressed by Formula 2 below. The function f is called an activation function.

[Math. 2]

$$z = f(u) \qquad \text{(Formula 2)}$$

Figure 10C:
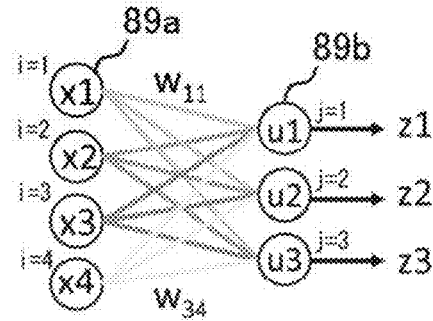
FIG. 10C is a schematic diagram for describing the neural network.

FIG. 10C is a schematic diagram illustrating calculation between nodes. In neural network 50, with respect to the total input (u) expressed by Formula 1, nodes that output results (z) each expressed by Formula 2 are arranged in a layered manner. Outputs from the nodes of the previous layer serve as inputs to the nodes of the next layer. In the example shown in FIG. 10C, the outputs from nodes 89a in the left layer in the figure serve as inputs to nodes 89b in the right layer. Each node 89b in the right layer receives outputs from the respective nodes 89a in the left layer. The connection between each node 89a in the left layer and each node 89b in the right layer is multiplied by a different weight. When the respective outputs from the plurality of nodes 89a of the left layer are defined as $x_1$ to $x_4$, the inputs to the respective three nodes 89b in the right layer are expressed by Formula 3-1 to Formula 3-3 below.

[Math. 3]

$$u_1 = w_{11}x_1 + w_{12}x_2 + w_{13}x_3 + w_{14}x_4 + b_1 \quad \text{(Formula 3-1)}$$

$$u_2 = w_{21}x_1 + w_{22}x_2 + w_{23}x_3 + w_{24}x_4 + b_2 \quad \text{(Formula 3-2)}$$

$$u_3 = w_{31}x_1 + w_{32}x_2 + w_{33}x_3 + w_{34}x_4 + b_3 \quad \text{(Formula 3-3)}$$

When Formula 3-1 to Formula 3-3 are generalized, Formula 3-4 is obtained. Here, i=1, . . . I, and j=1, . . . J.

[Math. 4]

$$u_j = \sum_{i=1}^{i} w_{ji} x_i + b_j \quad \text{(Formula 3-4)}$$

When Formula 3-4 is applied to an activation function, an output is obtained. The output is expressed by Formula 4 below.

[Math. 5]

$$z_j(u_j)(j=1,2,3) \quad \text{(Formula 4)}$$

(Activation Function)

In the image analysis method according to the embodiment, a rectified linear unit function is used as the activation function. The rectified linear unit function is expressed by Formula 5 below.

[Math. 6]

$$f(u) = \max(u, 0) \quad \text{(Formula 5)}$$

Formula 5 is a function obtained by setting u=0 to the part u<0 of the linear function with z=u. In the example shown in FIG. 10C, using Formula 5, the output from the node of j=1 is expressed by the formula below.

$$z_1 = \max((w_{11}x_1 + w_{12}x_2 + w_{13}x_3 + w_{14}x_4 + b_1), 0) \quad \text{[Math. 7]}$$

(Learning of Neural Network)

If the function expressed by use of the neural network is defined as y(x:w), the function y(x:w) changes when a parameter w of the neural network is changed. Adjusting the function y(x:w) such that the neural network selects a more suitable parameter w with respect to the input x is referred to as learning of the neural network. It is assumed that a plurality of pairs of an input and an output of the function expressed by use of the neural network have been provided. If a desirable output for an input x is defined as d, the pairs of the input/output are given as $\{(x_1, d_1), (x_2, d_2), \ldots, (x_n, d_n)\}$. The set of pairs each expressed as (x,d) is referred to as training data. Specifically, the set of pairs of a color density value and a label of the true value image for each pixel in a single color image of each color, R, G, or B shown in FIG. 2 is the training data.

The learning of the neural network means adjusting the weight w such that, with respect to any input/output pair $(x_n, d_n)$, the output $y(x_n: w)$ of the neural network when given an input $x_n$, becomes close to the output $d_n$ as much as possible. An error function is a scale for measuring the closeness

[Math. 8]

$$y(x_n: w) \approx d_n$$

between the training data and the function expressed by use of the neural network. The error function is also called a loss function. An error function E (w) used in the image analysis method according to the embodiment is expressed by Formula 6 below. Formula 6 is called cross entropy.

[Math. 9]

$$E(w) = -\sum_{n=1}^{N} \sum_{k=1}^{K} d_{nk} \log y_k(x_n; w) \quad \text{(Formula 6)}$$

A method for calculating the cross entropy in Formula 6 is described. In the output layer 50b of the neural network 50 to be used in the image analysis method according to the embodiment, that is, in the last layer of the neural network, an activation function is used that classifies inputs x into a finite number of classes according to the contents. The activation function is called a softmax function and expressed by Formula 7 below. It is assumed that, in the output layer 50b, the nodes are arranged by the same number as the number of classes k. It is assumed that the total input u of each node k (k=1, . . . K) in the output layer L is given as $u_k^{(L)}$ from the outputs of the previous layer L−1. Accordingly, the output of the k-th node in the output layer is expressed by Formula 7 below.

[Math. 10]

$$y_k \equiv z_k^{(L)} = \frac{\exp(u_k^{(L)})}{\sum_{j=1}^{K} \exp(u_j^{(L)})} \quad \text{(Formula 7)}$$

Formula 7 is the softmax function. The sum of outputs $y_1, \ldots, y_K$ determined by Formula 7 is always 1.

When each class is expressed as $C_1, \ldots, C_K$, output $y_K$ of node k in the output layer L (that is, $u_k^{(L)}$) represents the probability that a given input x belongs to class $C_K$. Refer to Formula 8 below. The input x is classified into a class which allows the probability expressed by Formula 8 to be the largest.

[Math. 11]

$$p(C_k|x) = y_k = z_k^{(L)} \quad \text{(Formula 8)}$$

In learning of the neural network, a function expressed by the neural network is considered as a model of the posterior probability of each class, the likelihood of weights w to the training data is evaluated under such a probabilistic model, and weights w that maximize the likelihood are selected.

It is assumed that target output by the softmax function of Formula 7 is 1 only if the output is a correct class, and otherwise, target output is 0. In a case where the target output is expressed in a vector format of $d_n = [d_{n1}, \ldots, d_{nK}]$, if, for example, the correct class of input $x_n$ is $C_3$, only target output $d_{n3}$ is 1, and the other target outputs are 0. When coding is performed in this manner, the posterior distribution is expressed by Formula 9 below.

[Math. 12]

$$p(d|x) = \prod_{k=1}^{K} p(C_k|x)^{d_k} \quad \text{(Formula 9)}$$

Likelihood L (w) of weights w to the training data $\{(x_n, d_n)\}(n=1, \ldots, N)$ is expressed by Formula 10 below. When the logarithm of likelihood L(w) is taken and the sign is inverted, the error function of Formula 6 is derived.

[Math. 13]

$$L(w) = \prod_{n=1}^{N} p(d_n|x_n; w) = \prod_{n=1}^{N} \prod_{k=1}^{K} p(C_k|x_n)^{d_{nk}} = \prod_{n=1}^{N} \prod_{k=1}^{K} (y_k(x; w))^{d_{nk}}$$

(Formula 10)

Learning means minimizing error function E(w) calculated on the basis of the training data with respect to parameter w of the neural network. In the image analysis method according to the embodiment, error function E(w) is expressed by Formula 6.

Minimizing error function E(w) with respect to parameter w has the same meaning as finding a local minimum point of function E(w). Parameter w is a weight of the connection between nodes. A minimum point of weight w is obtained by iterative calculation of iteratively updating parameter w from an arbitrary initial value as a starting point. An example of such calculation is the gradient descent method.

In the gradient descent method, a vector expressed by Formula 11 below is used.

[Math. 14]

$$\nabla E = \frac{\partial E}{\partial w} = \left[ \frac{\partial E}{\partial w_1}, \ldots, \frac{\partial E}{\partial w_M} \right]^T$$

(Formula 11)

In the gradient descent method, processing to move the value of current parameter w in the negative gradient direction (that is, $-\nabla E$) is iterated many times. If it is assumed that $w^{(t)}$ is the current weight and that $w^{(t+1)}$ is the weight after moving, the calculation according to the gradient descent method is expressed by Formula 12 below. Value t means the number of times the parameter w is moved.

[Math. 15]

$$w^{(t+1)} = w^{(t)} - \epsilon \nabla E$$

(Formula 12)

$\epsilon$

[Math. 16]

The above symbol is a constant that determines the magnitude of the update amount of parameter w, and is called a learning coefficient. By iterating the calculation expressed by Formula 12, as the value t increases, error function E(w (t)) decreases, and parameter w reaches a minimum point.

It should be noted that the calculation according to Formula 12 may be performed on all the training data (n=1, . . . , N) or may be performed on only part of the training data. The gradient descent method that is performed on only part of the training data is called a stochastic gradient descent method. In the image analysis method according to the embodiment, the stochastic gradient descent method is used.

(Image Analysis Process)

Figure 11:
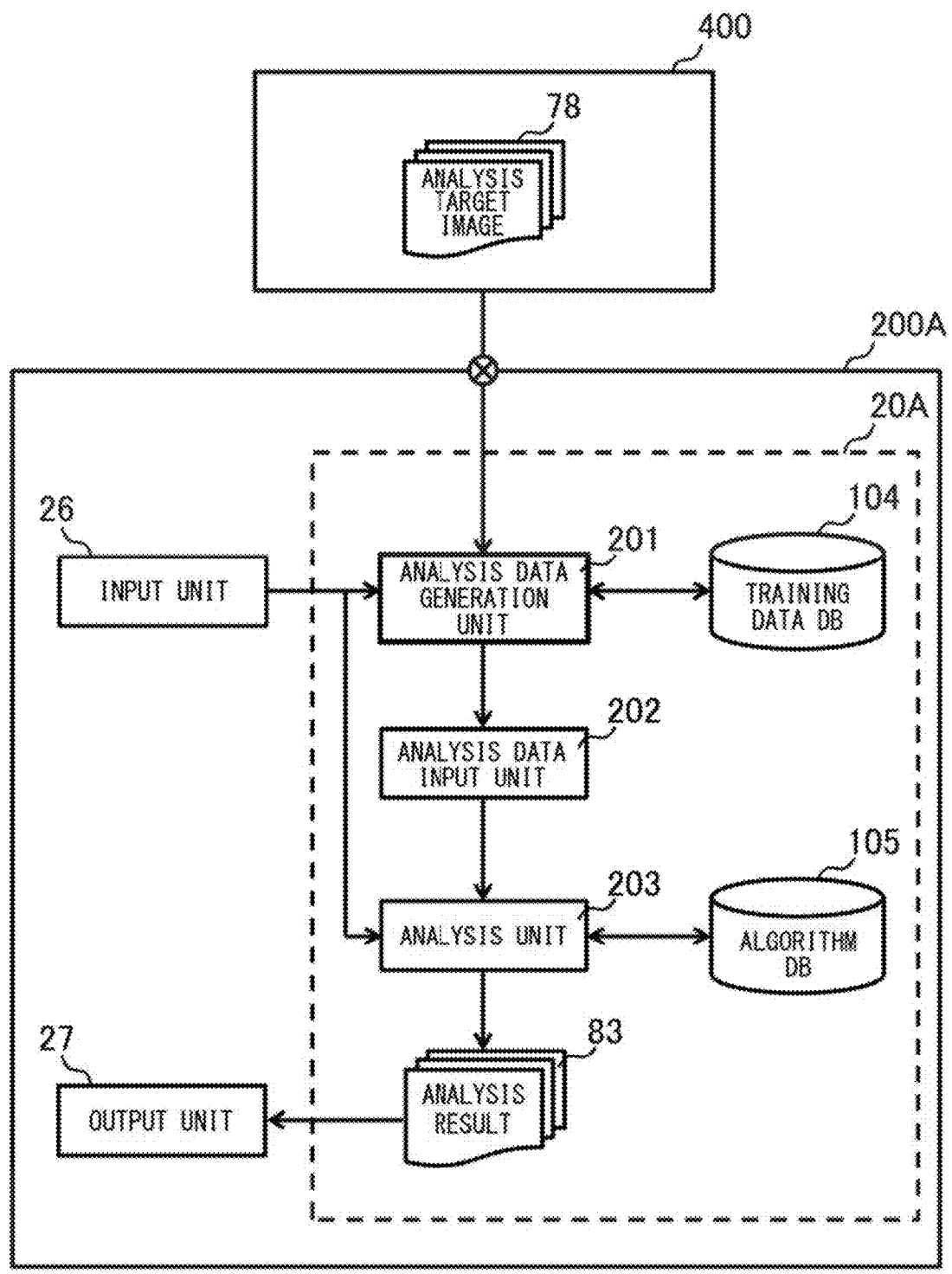
FIG. 11 is a block diagram for describing an example of the function of an image analysis apparatus 200A.

FIG. 11 shows a function block diagram of the image analysis apparatus 200A, which performs an image analysis process of generating the data 83 regarding cell morphology from the analysis target image 78. A processing unit 20A of the image analysis apparatus 200A includes an analysis data generation unit 201, an analysis data input unit 202, an analysis unit 203, and a cell nucleus area detection unit 204. These function blocks are realized when a program according to the present disclosure for causing a computer to execute the image analysis process is installed in the storage unit 23 or the memory 22 of the processing unit 20A, and the program is executed by the CPU 21. The training data database (DB) 104 and the algorithm database (DB) 105 are provided from the deep learning apparatus 100A through the storage medium 98 or the network 99, and are stored in the storage unit 23 or the memory 22 of the processing unit 20A.

Each analysis target image 78 is captured by the imaging apparatus 400 and is stored in the storage unit 23 or the memory 22 of the processing unit 20A. The first deep learning algorithm 60 and the second deep learning algorithm 61 which have been trained and which include connection weights w are stored in the algorithm database 105, in association with, for example, the morphological-classification-based cell type or cell feature to which the analysis target cell belongs. The first deep learning algorithm 60 and the second deep learning algorithm 61 function as program modules which are part of the program that causes the computer to execute the image analysis process. That is, the first deep learning algorithm 60 and the second deep learning algorithm 61 are used by the computer including a CPU and a memory. The first deep learning algorithm 60 and the second deep learning algorithm 61 are used in order to identify which of the morphologically classified types of a plurality of cells belonging to a predetermined cell group corresponds to the analysis target cell, and in order to generate the data 83 regarding the cell morphology. The generated data is outputted as necessary. The CPU 21 of the processing unit 20A causes the computer to function so as to execute specific information calculation or processing according to the use objective. Specifically, the CPU 21 of the processing unit 20A generates the data 83 regarding cell morphology, by use of the first deep learning algorithm 60 and the second deep learning algorithm 61 stored in the storage unit 23 or the memory 22. The CPU 21 of the processing unit 20A inputs the analysis data 81 to the input layer 60a and outputs, from the output layer 60b, the feature quantity of the analysis image 78 calculated by the first deep learning algorithm 60. The CPU 21 of the processing unit 20A inputs the feature quantity outputted from the first deep learning algorithm 60, into the input layer 61a of the second deep learning algorithm, and outputs, from the output layer 61b, a label value corresponding to the morphological-classification-based cell type or cell feature to which the analysis target cell has been identified as belonging. With reference to the function blocks shown in FIG. 11, the processes of steps S21 and S22 are performed by the analysis data generation unit 201. The processes of steps S23, S24, S25, and S27 are performed by the analysis data input unit 202. The process of step S26 is performed by the analysis unit 203.

Figure 12:
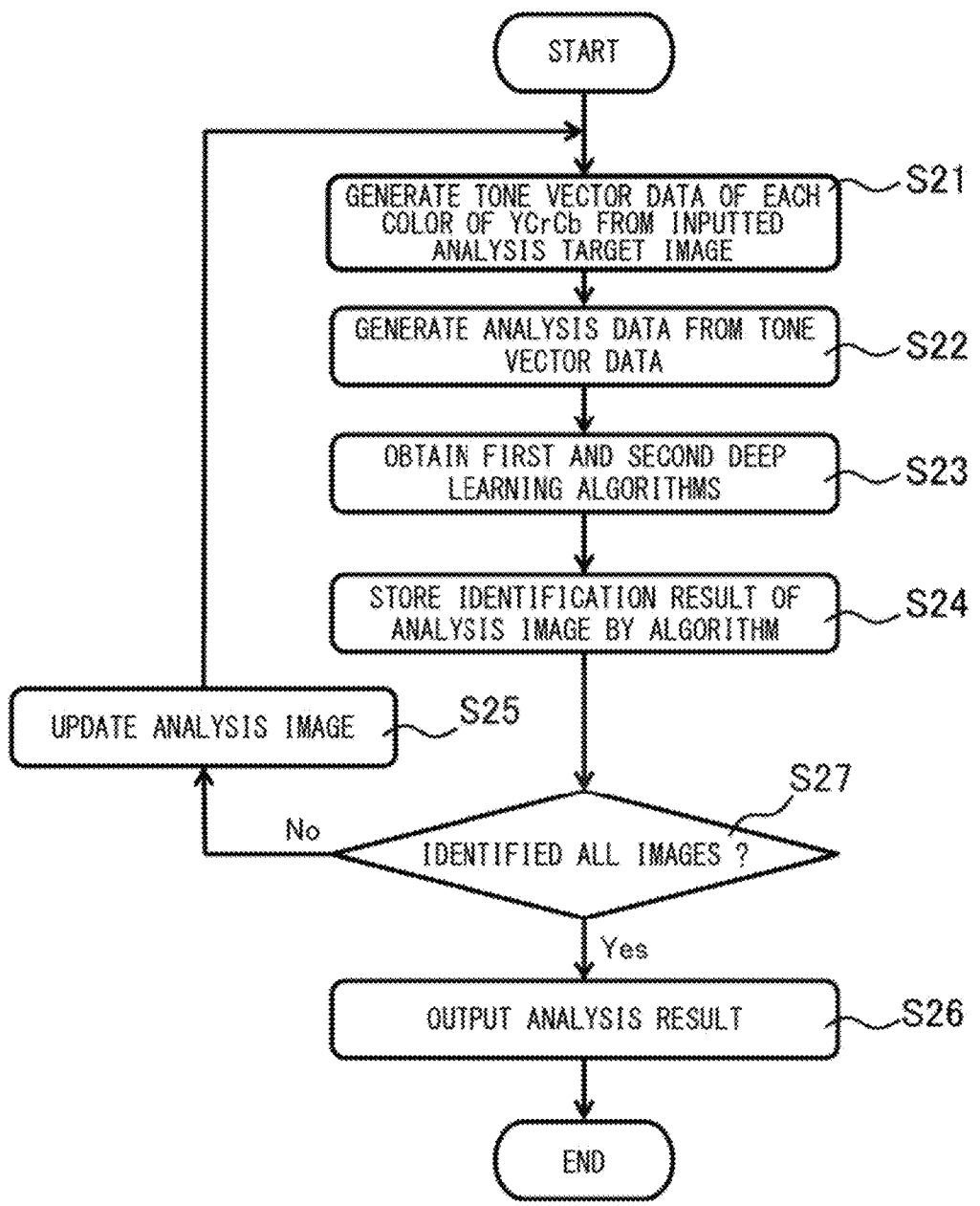
FIG. 12 is a flow chart showing an example of the flow of an image analysis process.

With reference to FIG. 12, description is given of an example of the image analysis process of generating the data 83 regarding the cell morphology from the analysis target image 78 performed by the processing unit 20A.

First, the processing unit 20A obtains analysis images 78. Each analysis image 78 is obtained via the I/F unit 25 through an operation by a user, from the imaging apparatus 400, from the storage medium 98, or via a network.

In step S21, similar to the step S11 shown in FIG. 9, the obtained analysis image 78 is converted into brightness Y, first hue Cb, and second hue Cr, and the tone vector data 80 is generated in accordance with the procedure described in the analysis data generation method above.

Next, in step S22, the processing unit 20A generates the analysis data 81 from the tone vector data 80 in accordance with the procedure described in the analysis data generation method above.

Next, in step S23, the processing unit 20A obtains the first deep learning algorithm and the second deep learning algorithm stored in the algorithm database 105.

Next, in step S24, the processing unit 20A inputs the analysis data 81 to the first deep learning algorithm. In accordance with the procedure described in the image analysis method above, the processing unit 20A inputs the feature quantity outputted from the first deep learning algorithm to the second deep learning algorithm. Then, a label value corresponding to the cell type or cell feature to which the analysis target cell included in the analysis image is determined as belonging is outputted from the second deep learning algorithm. The processing unit 20A stores this label value into the memory 22 or the storage unit 23.

In step S27, the processing unit 20A determines whether identification has been performed with respect to all the analysis images 78 initially obtained. When identification with respect to all the analysis images 78 has ended (YES), the processing unit 20A advances to step S26, and outputs an analysis result including the data 83 regarding the cell morphology. When identification with respect to all the analysis images 78 has not ended (NO), the processing unit 20A advances to step S25, and performs the processes of steps S21 to step S25 with respect to the analysis images 78 for which the identification has not been performed.

According to the present embodiment, identification of cell type and cell feature based on morphological classification can be performed regardless of the skill of the examiner, and morphology examinations can be suppressed from varying.

<Computer Program>

The present disclosure includes a computer program for performing image analysis for analyzing cell morphology, the computer program configured to cause a computer to execute the processes of steps S11 to S17 and/or S21 to S27.

Further, an embodiment of the present disclosure relates to a program product such as a storage medium having stored therein the computer program. That is, the computer program is stored in a storage medium such as a hard disk, a semiconductor memory device such as a flash memory or an optical disk. The storage form of the program into the storage medium is not restricted as long as the above-presented apparatus can read the program. The storage in the storage medium is preferably performed in a nonvolatile manner.

3. Image Analysis System 2

<Configuration of Image Analysis System 2>

Another mode of the image analysis system is described.

Figure 13:
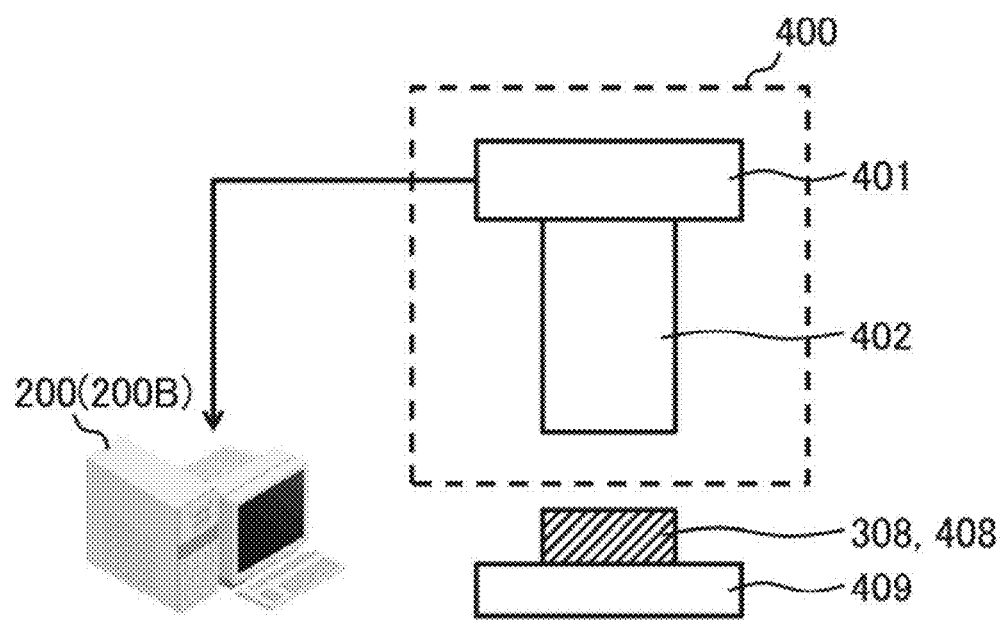
FIG. 13 is a schematic diagram of a configuration example of an image analysis system 2.

FIG. 13 shows a configuration example of a second image analysis system. The second image analysis system includes the user-side apparatus 200, and the user-side apparatus 200 operates as an integrated-type image analysis apparatus 200B. The image analysis apparatus 200B is implemented as a general purpose computer, for example, and performs both the deep learning process and the image analysis process described with respect to the image analysis system 1 above. That is, the second image analysis system is a stand-alone-type system that performs deep learning and image analysis on the user side. In the second image analysis system, the integrated-type image analysis apparatus 200B installed on the user side performs both functions of the deep learning apparatus 100A and the image analysis apparatus 200A according to the first embodiment.

In FIG. 13, the image analysis apparatus 200B is connected to the imaging apparatus 400. The imaging apparatus 400 captures training images 70 during the deep learning process, and captures analysis target images 78 during the image analysis process.

<Hardware Configuration>

The hardware configuration of the image analysis apparatus 200B is similar to the hardware configuration of the user-side apparatus 200 shown in FIG. 7.

<Function Block and Processing Procedure>

Figure 14:
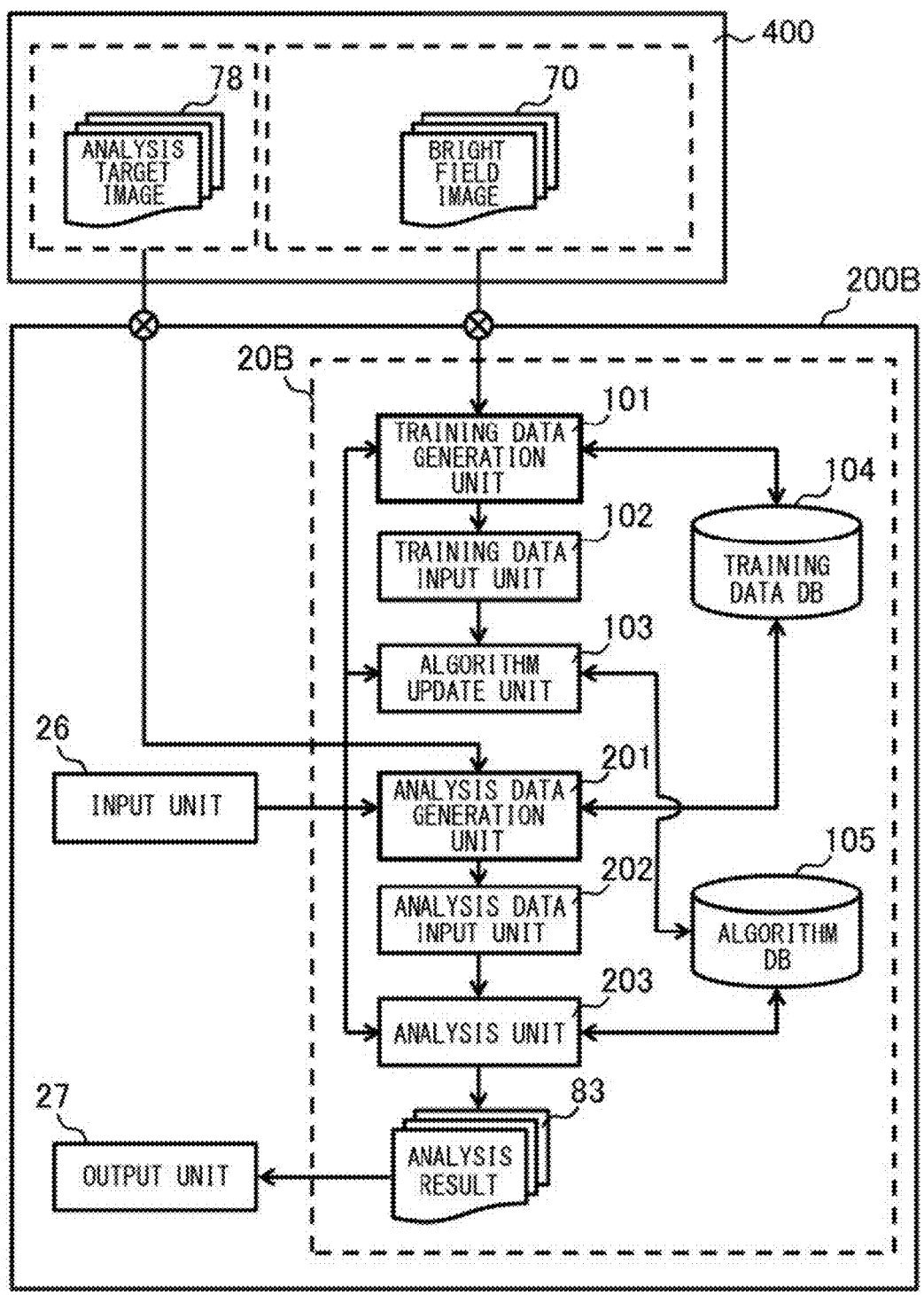
FIG. 14 is a block diagram for describing an example of the function of an integrated-type image analysis apparatus 200B.

FIG. 14 shows a function block diagram of the image analysis apparatus 200B. A processing unit 20B of the image analysis apparatus 200B includes the training data generation unit 101, the training data input unit 102, the algorithm update unit 103, the analysis data generation unit 201, the analysis data input unit 202, the analysis unit 203, and a cell nucleus detection unit 204. These function blocks are realized when a program for causing a computer to execute the deep learning process and the image analysis process is installed in the storage unit 23 or the memory 22 of the processing unit 20B, and the program is executed by the CPU 21. The training data database (DB) 104 and the algorithm database (DB) 105 are stored in the storage unit 23 or the memory 22 of the processing unit 20B, and both are used in common during the deep learning and the image analysis process. The first neural network 60 and the second neural network 61 that have been trained are stored in advance in the algorithm database 105 in association with the morphological-classification-based cell type or cell feature to which the analysis target cell belongs, for example. With connection weights w updated by the deep learning process, the deep learning algorithm 60 is stored in the algorithm database 105. It is assumed that each training image 70 is captured in advance by the imaging apparatus 400 and is stored in advance in the training data database (DB) 104 or in the storage unit 23 or the memory 22 of the processing unit 20B. It is also assumed that each analysis target image 78 of the analysis target preparation is captured in advance by the imaging apparatus 400, and is stored in advance in the storage unit 23 or the memory 22 of the processing unit 20B.

The processing unit 20B of the image analysis apparatus 200B performs the process shown in FIG. 9 during the deep learning process, and performs the process shown in FIG. 12 during the image analysis process. With reference to the function blocks shown in FIG. 14, during the deep learning process, the processes of steps S11, S12 S16, and S17 are performed by the training data generation unit 101. The process of step S13 is performed by the training data input unit 102. The processes of steps S14 and S15 are performed by the algorithm update unit 103. During the image analysis process, the processes of steps S21 and S22 are performed by the analysis data generation unit 201. The processes of steps S23, S24, S25, and S27 are performed by the analysis data input unit 202. The process of step S26 is performed by the analysis unit 203.

The procedure of the deep learning process and the procedure of the image analysis process performed by the image analysis apparatus 200B are similar to the procedures respectively performed by the deep learning apparatus 100A and the image analysis apparatus 200A. However, the image analysis apparatus 200B obtains the training image 70 from the imaging apparatus 400.

In the image analysis apparatus 200B, the user can confirm the identification accuracy of the classifier. If the identification result by the classifier is different from the identification result obtained through image observation by the user, the first deep learning algorithm and the second deep learning algorithm can be re-trained by using the analysis data 81 as training data 78 and by using, as the label value 77, the identification result obtained through image observation by the user. Accordingly, the training efficiency of the first neural network 50 and the second neural network 51 can be improved.

3. Image Analysis System 3

<Configuration of Image Analysis System 3>

Another mode of the image analysis system is described.

Figure 15:
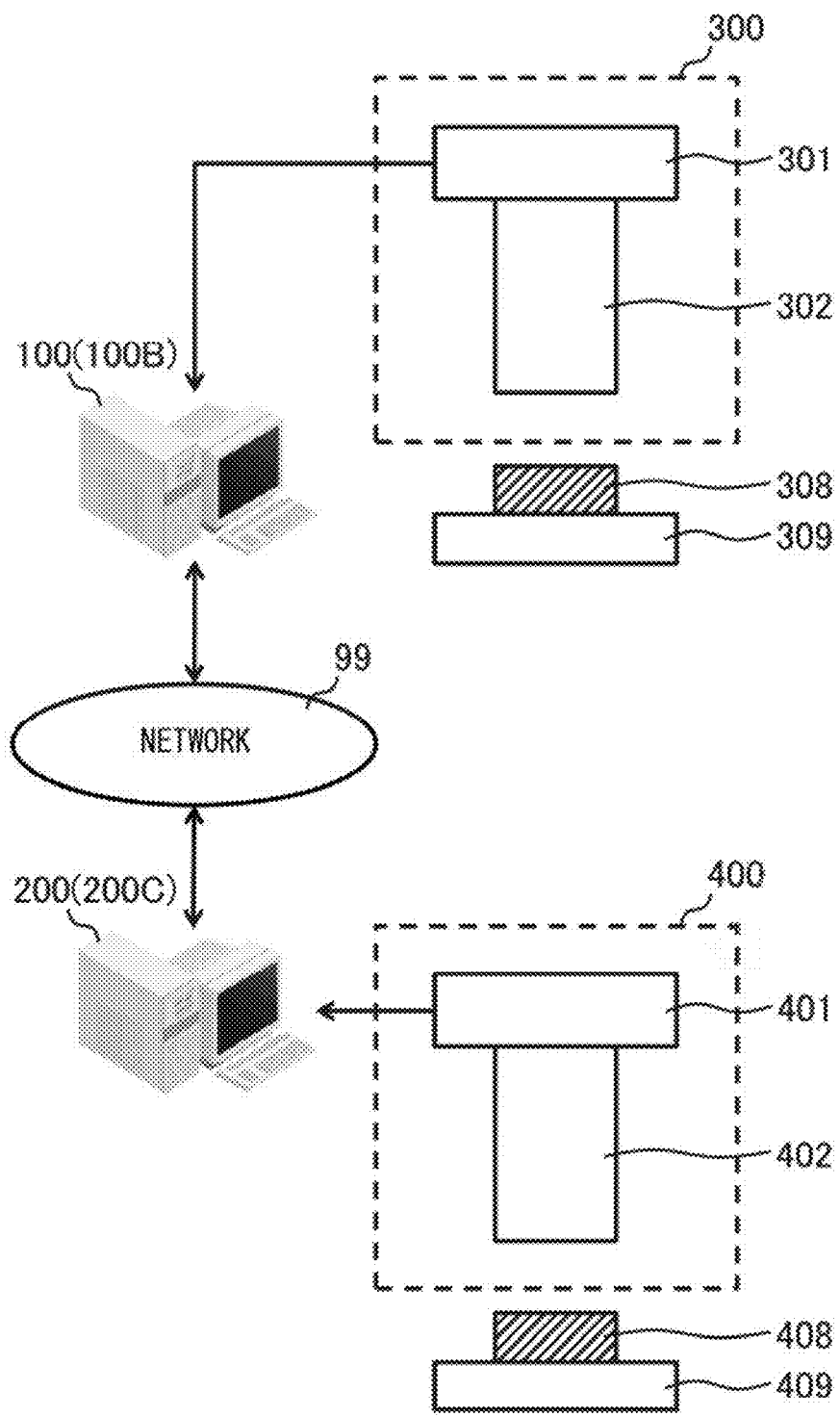
FIG. 15 is a schematic diagram of a configuration example of an image analysis system 3.

FIG. 15 shows a configuration example of a third image analysis system. The third image analysis system includes the vendor-side apparatus 100 and the user-side apparatus 200. The vendor-side apparatus 100 operates as an integrated-type image analysis apparatus 100B, and the user-side apparatus 200 operates as a terminal apparatus 200C. The image analysis apparatus 100B is implemented as a general purpose computer, for example, and is a cloud-server-side apparatus which performs both the deep learning process and the image analysis process described with respect to the image analysis system 1. The terminal apparatus 200C is implemented as a general purpose computer, for example, and is a user-side terminal apparatus which transmits images of the analysis target to the image analysis apparatus 100B through the network 99, and receives analysis result images from the image analysis apparatus 100B through the network 99.

In the third image analysis system, the integrated-type image analysis apparatus 100B installed on the vendor side performs both functions of the deep learning apparatus 100A and the image analysis apparatus 200A. Meanwhile, the third image analysis system includes the terminal apparatus 200C, and provides the terminal apparatus 200C on the user side with an input interface for the analysis image 78 and an output interface for the analysis result image. That is, the third image analysis system is a cloud-service-type system in which the vendor side, which performs the deep learning process and the image analysis process, provides an input interface for providing the analysis image 78 to the user side, and an output interface for providing the data 83 regarding cell morphology to the user side. The input interface and the output interface may be integrated.

The image analysis apparatus 100B is connected to the imaging apparatus 300, and obtains the training image 70 captured by the imaging apparatus 300.

The terminal apparatus 200C is connected to the imaging apparatus 400, and obtains the analysis target image 78 captured by the imaging apparatus 400.

<Hardware Configuration>

The hardware configuration of the image analysis apparatus 100B is similar to the hardware configuration of the vendor-side apparatus 100 shown in FIG. 6. The hardware configuration of the terminal apparatus 200C is similar to the hardware configuration of the user-side apparatus 200 shown in FIG. 7.

<Function Block and Processing Procedure>

Figure 16:
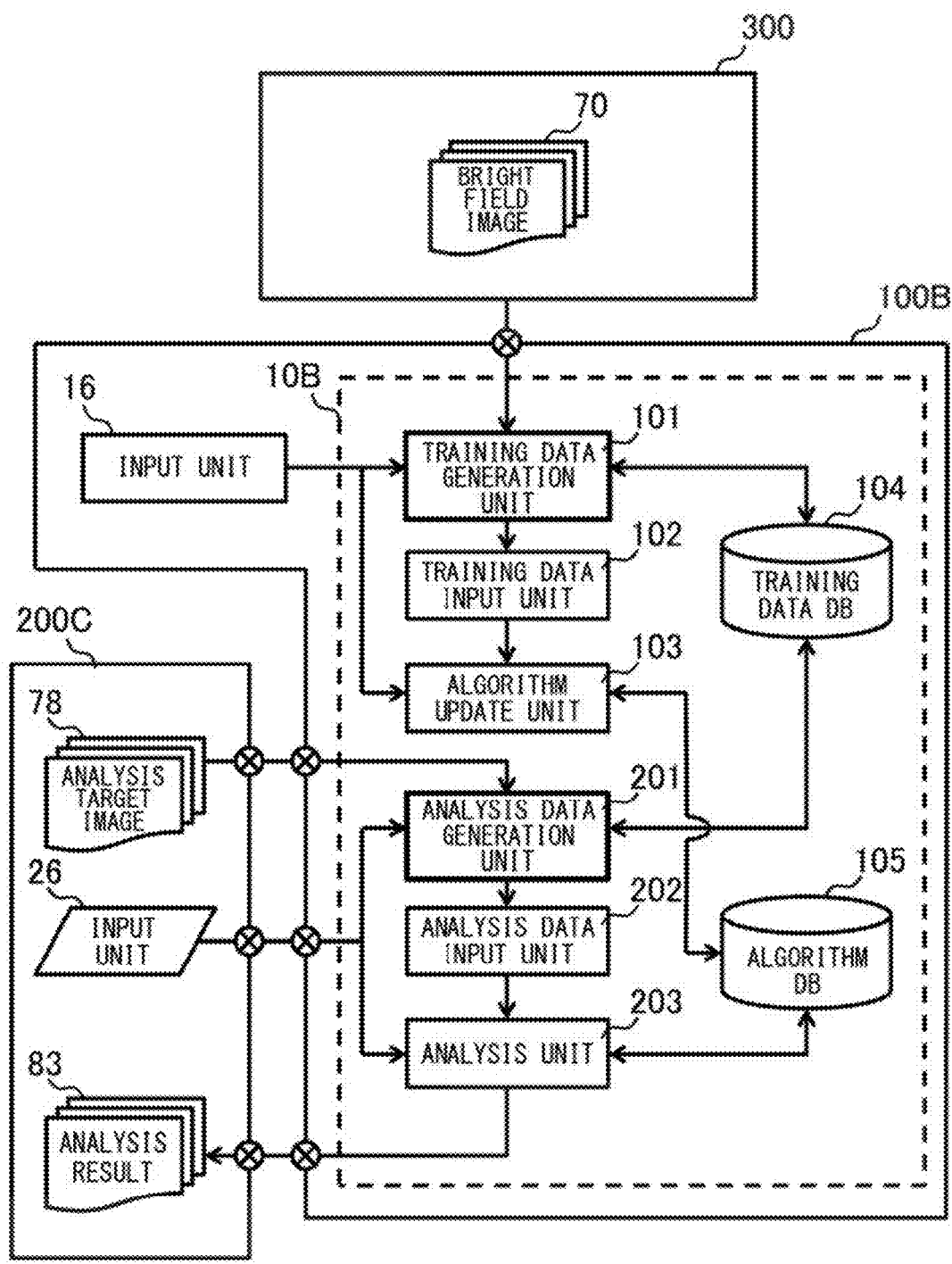
FIG. 16 is a block diagram for describing an example of the function of an integrated-type image analysis apparatus 100B.

FIG. 16 shows a function block diagram of the image analysis apparatus 100B. A processing unit 10B of the image analysis apparatus 100B includes the training data generation unit 101, the training data input unit 102, the algorithm update unit 103, the analysis data generation unit 201, the analysis data input unit 202, the analysis unit 203, and the cell nucleus area detection unit 204. These function blocks are realized when a program for causing a computer to execute the deep learning process and the image analysis process is installed in the storage unit 13 or the memory 12 of the processing unit 10B, and the program is executed by the CPU 11. The training data database (DB) 104 and the algorithm database (DB) 105 are stored in the storage unit 13 or the memory 12 of the processing unit 10B, and both are used in common during the deep learning and the image analysis process. The first neural network 50 and the second neural network 51 are stored in advance in the algorithm database 105 in association with the morphological-classification-based cell type or cell feature to which the analysis target cell belongs, for example, and are stored in the algorithm database 105 as the first deep learning algorithm 60 and the second deep learning algorithm 61, with connection weights w updated by the deep learning process.

Each training image 70 is captured in advance by the imaging apparatus 300 and is stored in advance in the training data database (DB) 104 or in the storage unit 13 or the memory 12 of the processing unit 10B. It is assumed that each analysis target image 78 is captured by the imaging apparatus 400 and is stored in advance in the storage unit 23 or the memory 22 of the processing unit 20C of the terminal apparatus 200C.

The processing unit 10B of the image analysis apparatus 100B performs the process shown in FIG. 9 during the deep learning process, and performs the process shown in FIG. 12 during the image analysis process. With reference to the function blocks shown in FIG. 16, the processes of steps S11, S12, S16, and S17 are performed by the training data generation unit 101 during the deep learning process. The process of step S13 is performed by the training data input unit 102. The processes of steps S14 and S15 are performed by the algorithm update unit 103. During the image analysis process, the processes of steps S21 and S22 are performed by the analysis data generation unit 201. The processes of steps S23, S24, S25, and S27 are performed by the analysis data input unit 202. The process of step S26 is performed by the analysis unit 203.

The procedure of the deep learning process and the procedure of the image analysis process performed by the image analysis apparatus 100B are similar to the procedures respectively performed by the deep learning apparatus 100A and the image analysis apparatus 200A according to the first embodiment.

The processing unit 10B receives the analysis target image 78 from the terminal apparatus 200C on the user side, and generates the training data 75 in accordance with steps S11 to S17 shown in FIG. 9.

In step S26 shown in FIG. 12, the processing unit 10B transmits the analysis result including the data 83 regarding cell morphology, to the terminal apparatus 200C on the user side. In the terminal apparatus 200C on the user side, the processing unit 20C outputs the received analysis result to the output unit 27.

In this manner, by transmitting the analysis target image 78 to the image analysis apparatus 100B, the user of the terminal apparatus 200C can obtain the data 83 regarding cell morphology as the analysis result.

According to the image analysis apparatus 100B of the third embodiment, the user can use the classifier, without obtaining the training data database 104 and the algorithm database 105 from the deep learning apparatus 100A. Accordingly, the service for identifying the cell type and cell feature based on morphological classification can be provided as a cloud service.

4. Other Embodiments

The outlines and specific embodiments of the present disclosure have been described. However, the present disclosure is not limited to the outlines and embodiments described above.

In the present disclosure, an example of a method for generating the training data 75 by converting the tone into brightness Y, first hue Cb, and second hue Cr has been described. However, the conversion of the tone is not limited thereto. Without converting the tone, the three primary colors of red (R), green (G), and blue (B), for example, may be directly used. Alternatively, two primary colors obtained by excluding one hue from the primary colors may be used. Alternatively, one primary color (for example, green (G) only) obtained by selecting any one of the three primary colors of red (R), green (G), and blue (B) may be used. The conversion into three primary colors of cyan (C), magenta (M), and yellow (Y) may be employed. Also, for example, the analysis target image 78 is not limited to a color image of the three primary colors of red (R), green (G), and blue (B), and may be a color image of two primary colors. It is sufficient that the image includes one or more primary colors.

In the training data generation method and the analysis data generation method described above, in step S11, the processing unit 10A, 20B, 10B generates the tone matrix 72y, 72cb, 72cr from the training image 70. However, the training image 70 may be the one converted into brightness Y, first hue Cb, and second hue Cr. That is, the processing unit 10A, 20B, 10B may originally obtain brightness Y, first hue Cb, and second hue Cr, directly from the virtual slide scanner or the like, for example. Similarly, in step S21, although the processing unit 20A, 20B, 10B generates the tone matrix 72y, 72cb, 72cr from the analysis target image 78, the processing unit 20A, 20B, 10B may originally obtain brightness Y, first hue Cb, and second hue Cr, directly from the virtual slide scanner or the like, for example.

Other than RGB and CMY, various types of color spaces such as YUV and CIE L*a*b* can be used in image obtainment and tone conversion.

In the tone vector data 74 and the tone vector data 80, for each pixel, information of tone is stored in the order of brightness Y, first hue Cb, and second hue Cr. However, the order of storing the information of tone and the handling order thereof are not limited thereto. However, the arrangement order of the information of tone in the tone vector data 74 and the arrangement order of the information of tone in the tone vector data 80 are preferably the same with each other.

In each image analysis system, the processing unit 10A, 10B is realized as an integrated apparatus. However, the processing unit 10A, 10B may not necessarily be an integrated apparatus. Instead, a configuration may be employed in which the CPU 11, the memory 12, the storage unit 13, the GPU19, and the like, are arranged at separate places; and these are connected through a network. Also, the processing unit 10A, 10B, the input unit 16, and the output unit 17 may not necessarily be disposed at one place, and may be respectively arranged at separate places and communicably connected with one another through a network. This also applies to the processing unit 20A, 20B, 20C.

In the first to third embodiments, the function blocks of the training data generation unit 101, the training data input unit 102, the algorithm update unit 103, the analysis data generation unit 201, the analysis data input unit 202, and the analysis unit 203 are executed by a single CPU 11 or a single CPU 21. However, these function blocks may not necessarily be executed by a single CPU, and may be executed in a distributed manner by a plurality of CPUs. These function blocks may be executed in a distributed manner by a plurality of GPUs, or may be executed in a distributed manner by a plurality of CPUs and a plurality of GPUs.

In the second and third embodiments, the program for performing the process of each step described with reference to FIG. 9, 12 is stored in advance in the storage unit 13, 23. Instead, the program may be installed in the processing unit 10B, 20B from a computer-readable, non-transitory, and tangible storage medium 98 such as a DVD-ROM or a USB memory, for example. Alternatively, the processing unit 10B, 20B may be connected to the network 99 and the program may be downloaded from, for example, an external server (not shown) through the network 99 and installed.

In each image analysis system, the input unit 16, 26 is an input device such as a keyboard or a mouse, and the output unit 17, 27 is realized as a display device such as a liquid crystal display. Instead, the input unit 16, 26, and the output unit 17, 27 may be integrated to realize a touch-panel-type display device. Alternatively, the output unit 17, 27 may be implemented by a printer or the like.

In each image analysis system described above, the imaging apparatus 300 is directly connected to the deep learning apparatus 100A or the image analysis apparatus 100B. However, the imaging apparatus 300 may be connected to the deep learning apparatus 100A or the image analysis apparatus 100B via the network 99. Also with respect to the imaging apparatus 400, similarly, although the imaging apparatus 400 is directly connected to the image analysis apparatus 200A or the image analysis apparatus 200B, the imaging apparatus 400 may be connected to the image analysis apparatus 200A or the image analysis apparatus 200B via the network 99.

5. Effect of Deep Learning Algorithm

In order to validate the effect of the deep learning algorithm, the cell identification accuracy by a cell identification method using conventional machine learning was compared with the cell identification accuracy by the cell identification method using the deep learning algorithm of the present disclosure.

A peripheral blood smear preparation was created by a smear preparation creation apparatus SP-1000i, and cell image capturing was performed by a hemogram automatic analyzer DI-60. May-Giemsa stain was used as the stain.

Cell identification by the conventional machine learning was performed by the hemogram automatic analyzer DI-60. Three persons including a doctor and an experienced laboratory technician observed the image to perform the validation.

FIG. 17 shows the comparison result of hemocyte classification accuracy. When the deep learning algorithm was used, discrimination at a higher accuracy than in the conventional method was achieved.

Next, it was examined whether the deep learning algorithm of the present disclosure was able to identify morphological features observed in myelodysplastic syndromes (MDS). FIG. 18 shows the result.

As shown in FIG. 18, morphological nucleus abnormality, vacuolation, granule distribution abnormality, and the like were accurately identified.

From the above result, it was considered that the deep learning algorithm of the present disclosure can accurately identify the type of cell and the feature of cell based on morphological classification.

What is claimed is:
1. An image analysis method comprising:
inputting analysis data into a deep learning algorithm having a neural network structure, the analysis data being generated from an image of an analysis target cell and including information regarding the analysis target cell; and classifying, by use of the deep learning algorithm, the analysis target cell into at least one of categories of a blood cell, wherein the categories include morphological features of white blood cells observed in myelodysplastic syndromes, wherein the morphological features of white blood cells include at least morphological nucleus abnormality, presence of vacuole, granule morphological abnormality, granule distribution abnormality, presence of abnormal granule, cell size abnormality, presence of inclusion body, or bare nucleus.

2. The image analysis method of claim 1, further comprising outputting the classified category of the analysis target cell.

3. The image analysis method of claim 2, further comprising receiving a user's modification of the outputted category.

4. The image analysis method of claim 1, further comprising
trimming the image of the analysis target cell so that some other cells other than a target blood cell are removed from the image before inputting the analysis data into the deep learning algorithm.

5. The image analysis method of claim 1, wherein
the analysis target cell in the image has been stained.

6. The image analysis method of claim 5, wherein
the analysis target cell has been stained by Wright's staining, Giemsa staining, Wright-Giemsa staining, or May-Giemsa staining.

7. The image analysis method of claim 1, wherein
the analysis target cell is contained in a peripheral blood.

8. The image analysis method of claim 1, further comprising:
obtaining a plurality of the images of the analysis target cell from a blood smear preparation; and
generating the analysis data for each of the plurality of the images.

9. The image analysis method of claim 1, wherein
the image of the analysis target cell contains a single analysis target cell.

10. The image analysis method of claim 9, wherein
the image of the analysis target cell contains red blood cells along with the analysis target cell.

11. The image analysis method of claim 1, wherein
the analysis data comprises color data for each of pixels in the image of the analysis target cell.

12. The image analysis method of claim 1, wherein
the analysis data comprises vector data for each of pixels in the image of the analysis target cell.

13. The image analysis method of claim 1, wherein
the categories further include morphological features of platelets.

14. An image analysis apparatus comprising
a processor configured to:
input analysis data into a deep learning algorithm having a neural network structure, the analysis data being generated from an image of an analysis target cell and including information regarding the analysis target cell; and classify, by use of the deep learning algorithm, the analysis target cell into at least one of categories of a blood cell, wherein the categories include morphological features of white blood cells observed in myelodysplastic syndromes, wherein the morphological features of white blood cells include at least morphological nucleus abnormality, presence of vacuole, granule morphological abnormality, granule distribution abnormality, presence of abnormal granule, cell size abnormality, presence of inclusion body, or bare nucleus.

15. The image analysis apparatus of claim 14, wherein
the morphological features include at least morphological nucleus abnormality, presence of vacuole, granule morphological abnormality, granule distribution abnormality, presence of abnormal granule, cell size abnormality, presence of inclusion body, or bare nucleus.

16. The image analysis apparatus of claim 14, wherein
the image analysis apparatus is connected to a computer via a network, wherein the computer is linked with an imaging apparatus configured to capture the image of the analysis target cell, and
the processor is configured to:
receive the image of the analysis target cell from the computer via the network;
input the analysis data, generated from the received image of the analysis target cell, into the deep learning algorithm;
classify, by use of the deep learning algorithm, the analysis target cell into at least one of the categories; and
transmit the classified category to the computer via the network.

17. The image analysis apparatus of claim 14, wherein
the analysis data comprises color data for each of pixels in the image of the analysis target cell.

18. The image analysis apparatus of claim 14, wherein
the analysis data comprises vector data for each of pixels in the image of the analysis target cell.

19. The image analysis apparatus of claim 14, wherein
the categories further include morphological features of platelets.

20. A non-transitory computer readable medium storing programs executable by a processor to:
input analysis data into a deep learning algorithm having a neural network structure, the analysis data being generated from an image of an analysis target cell and including information regarding the analysis target cell; and
classify, by use of the deep learning algorithm, the analysis target cell into at least one of categories of a blood cell, wherein
the categories include morphological features of white blood cells observed in myelodysplastic syndromes, wherein
the morphological features of white blood cells include at least morphological nucleus abnormality, presence of vacuole, granule morphological abnormality, granule distribution abnormality, presence of abnormal granule, cell size abnormality, presence of inclusion body, or bare nucleus.

* * * * *